US011446743B2

(12) United States Patent
Frota De Souza Filho et al.

(10) Patent No.: US 11,446,743 B2
(45) Date of Patent: Sep. 20, 2022

(54) SIDE-LOCK MODULAR DRILL WITH SPRING-ASSISTED BUMP-OFF

(71) Applicant: Kennametal Inc., Latrobe, PA (US)

(72) Inventors: Ruy Frota De Souza Filho, Latrobe, PA (US); Alan Joseph Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/445,741

(22) Filed: Jun. 19, 2019

(65) Prior Publication Data

US 2019/0388976 A1 Dec. 26, 2019

Related U.S. Application Data

(60) Provisional application No. 62/687,682, filed on Jun. 20, 2018.

(51) Int. Cl.
*B23B 51/00* (2006.01)
*B23B 31/06* (2006.01)
(Continued)

(52) U.S. Cl.
CPC .............. *B23B 27/16* (2013.01); *B23B 51/02* (2013.01); *B23B 2251/50* (2013.01);
(Continued)

(58) Field of Classification Search
CPC . B23B 2251/02; B23B 2251/50; B23B 51/02; B23B 51/06; B23B 31/06;
(Continued)

(56) References Cited

U.S. PATENT DOCUMENTS 124,089 A 2/1872 Shepardson
318,994 A 6/1885 Lake
(Continued)

FOREIGN PATENT DOCUMENTS

CN 101801576 A 9/2012
CN 103692001 A 4/2014
(Continued)

OTHER PUBLICATIONS

Nov. 15, 2019 Exam Notice.
(Continued)

*Primary Examiner* — Chwen-Wei Su
(74) *Attorney, Agent, or Firm* — Larry R. Meenan

(57) ABSTRACT

A rotary cutting tool with a shank and an interchangeable cutting tip, wherein the shank includes a pocket which receives the interchangeable cutting tip via an interference fit. The pocket includes two centering wall portions which, when viewed along a central longitudinal axis, are oriented at a first angle with respect to one another, the first angle being greater than zero. The interchangeable cutting tip is axially displaceable between: an initial position, assumed upon being received in the pocket of the shank; a clamped position, wherein the interchangeable cutting tip is fixedly held with respect to the shank; and a bump-off position, wherein the interchangeable cutting tip is not fixedly held. A holding element holds the interchangeable cutting tip in the clamped position, and a spring assembly which displaces the interchangeable cutting tip between the clamped position and the bump-off position. Other variants and embodiments are broadly contemplated herein.

15 Claims, 19 Drawing Sheets

(51) Int. Cl.
*B23B 31/107* (2006.01)
*B23B 27/16* (2006.01)
*B23B 51/02* (2006.01)

(52) U.S. Cl.
CPC ... *B23B 2260/082* (2013.01); *B23B 2260/124* (2013.01); *B23B 2260/136* (2013.01)

(58) Field of Classification Search
CPC . B23B 31/08; B23B 31/1075; B23B 31/1076; B23B 27/16; B23B 2260/136; B23B 31/083; B23B 2260/082; B23B 2260/124; Y10T 408/95; Y10T 408/957
See application file for complete search history.

(56) References Cited

U.S. PATENT DOCUMENTS

| | | | |
|---|---|---|---|
| 1,461,023 A | | 7/1923 | Becker |
| 1,461,548 A | | 7/1923 | West |
| 1,946,158 A | * | 2/1934 | Gorg ................. B23B 31/06 279/55 |
| 2,167,014 A | * | 7/1939 | Verderber ............... B23B 31/06 279/83 |
| 2,399,939 A | | 5/1946 | Phillips |
| 2,400,856 A | | 5/1946 | Thompson |
| 2,485,799 A | | 10/1949 | Woytych |
| 2,801,614 A | | 8/1957 | Dieterich et al. |
| 2,847,225 A | | 8/1958 | Kosinski |
| 3,049,033 A | | 8/1962 | Benjamin |
| 3,311,023 A | | 3/1967 | Kaiser |
| 3,436,990 A | | 4/1969 | Tourison |
| 4,611,672 A | | 9/1986 | Holzl |
| 4,632,593 A | | 12/1986 | Stashko |
| 4,726,268 A | | 2/1988 | Erickson |
| 4,744,704 A | | 5/1988 | Galvefors |
| 4,813,829 A | | 3/1989 | Koppelmann |
| 4,854,789 A | | 8/1989 | Evseanko, Jr. |
| 4,913,607 A | | 4/1990 | von Haas |
| 5,407,308 A | | 4/1995 | Takayoshi |
| 5,452,971 A | | 9/1995 | Nevills |
| 5,599,145 A | | 2/1997 | Reinauer et al. |
| 5,622,460 A | | 4/1997 | Satran et al. |
| 5,678,645 A | | 10/1997 | Tibbitts et al. |
| 5,704,742 A | | 1/1998 | Reinauer |
| 5,820,318 A | | 10/1998 | Danielsson et al. |
| 5,904,448 A | | 5/1999 | Lee |
| 5,904,455 A | | 5/1999 | Krenzer et al. |
| 5,957,631 A | | 9/1999 | Hecht |
| 5,957,635 A | | 9/1999 | Nuzzi et al. |
| 5,961,259 A | | 10/1999 | Ziegler |
| 5,971,673 A | | 10/1999 | Berglund |
| 6,012,881 A | | 1/2000 | Scheer |
| 6,109,152 A | | 8/2000 | Hecht |
| 6,109,841 A | | 8/2000 | Johne |
| 6,196,769 B1 | | 3/2001 | Satran et al. |
| 6,276,879 B1 | | 8/2001 | Hecht |
| 6,447,222 B2 | | 9/2002 | Kojima |
| 6,485,235 B1 | | 11/2002 | Mast et al. |
| 6,506,003 B1 | * | 1/2003 | Erickson ................. B23B 51/02 408/226 |
| 6,514,019 B1 | | 2/2003 | Schulz |
| 6,530,728 B2 | | 3/2003 | Eriksson |
| 6,582,164 B1 | | 6/2003 | McCormick |
| 6,783,307 B2 | | 8/2004 | Lindblom |
| 6,783,308 B2 | | 8/2004 | Lindblom |
| 7,070,367 B2 | | 7/2006 | Krenzer |
| 7,131,799 B2 | | 11/2006 | Stokey et al. |
| 7,309,196 B2 | | 12/2007 | Ruy Frota de Souza |
| 7,311,480 B2 | | 12/2007 | Heule et al. |
| 7,360,974 B2 | | 4/2008 | Borschert et al. |
| 7,377,730 B2 | | 5/2008 | Hecht et al. |
| 7,407,350 B2 | | 8/2008 | Hecht et al. |
| 7,467,915 B2 | | 12/2008 | Ruy |
| 7,478,983 B2 | | 1/2009 | Guy |
| 7,625,161 B1 | | 12/2009 | Ruy Frota de Souza |
| 7,972,094 B2 | | 7/2011 | Men et al. |
| 7,997,836 B2 | | 8/2011 | Kim et al. |
| 8,312,615 B2 | | 11/2012 | Frota de Souza Filho |
| 8,449,227 B2 | | 5/2013 | Danielsson |
| 8,550,756 B2 | | 10/2013 | Borschert et al. |
| 8,678,722 B2 | | 3/2014 | Aare |
| 8,702,356 B2 | | 4/2014 | Hecht et al. |
| 8,721,235 B2 | | 5/2014 | Kretzschmann et al. |
| 8,784,018 B2 | | 7/2014 | Pábel |
| 8,840,347 B2 | | 9/2014 | Aare |
| 8,876,444 B1 | | 11/2014 | Chanturidze |
| 8,876,446 B1 | | 11/2014 | Shaheen |
| 8,882,413 B2 | | 11/2014 | Hecht |
| 8,992,143 B2 | | 3/2015 | Glimpel et al. |
| 9,073,129 B2 | | 7/2015 | Craig et al. |
| 9,108,251 B2 | | 8/2015 | Craig |
| 9,162,295 B2 | | 10/2015 | Pábel et al. |
| 9,205,498 B2 | | 12/2015 | Jaeger |
| 9,468,979 B2 | | 10/2016 | Hecht |
| 9,545,699 B2 | | 1/2017 | Furusawa et al. |
| 9,555,484 B2 | | 1/2017 | Koga |
| 9,770,766 B2 | | 9/2017 | Singer-Schnoeller |
| 9,895,754 B2 | | 2/2018 | Mani |
| 10,207,337 B2 | | 2/2019 | Frota de Souza Filho |
| 10,213,845 B2 | | 2/2019 | Schwaegerl et al. |
| 10,471,522 B2 | * | 11/2019 | Yamamoto .............. B23B 51/06 |
| 2001/0026738 A1 | | 10/2001 | Kojima |
| 2002/0015623 A1 | | 2/2002 | Eriksson |
| 2002/0168239 A1 | | 11/2002 | Mast et al. |
| 2003/0091402 A1 | | 5/2003 | Lindblom |
| 2003/0091403 A1 | | 5/2003 | Lindblom |
| 2003/0219321 A1 | | 11/2003 | Borschert et al. |
| 2005/0098359 A1 | | 5/2005 | Lee |
| 2006/0051172 A1 | | 3/2006 | Johnson et al. |
| 2007/0274794 A1 | | 11/2007 | Cirino |
| 2008/0003072 A1 | | 1/2008 | Kim et al. |
| 2008/0101878 A1 | | 5/2008 | Skilberg |
| 2010/0021253 A1 | | 1/2010 | Frejd |
| 2010/0104384 A1 | | 4/2010 | Orlov et al. |
| 2010/0303561 A1 | | 12/2010 | Fouquer |
| 2010/0322723 A1 | | 12/2010 | Danielsson |
| 2010/0322731 A1 | | 12/2010 | Aare |
| 2011/0008114 A1 | | 1/2011 | Wang |
| 2011/0110735 A1 | | 5/2011 | Klettenheimer et al. |
| 2011/0110739 A1 | | 5/2011 | Frisendahi |
| 2011/0114393 A1 | | 5/2011 | Dolan et al. |
| 2011/0238145 A1 | | 9/2011 | Pä bel |
| 2012/0014760 A1 | | 1/2012 | Glimpel et al. |
| 2012/0014860 A1 | | 1/2012 | Harris et al. |
| 2012/0148358 A1 | | 6/2012 | Hecht et al. |
| 2012/0230787 A1 | | 9/2012 | Harif |
| 2013/0042462 A1 | | 2/2013 | Frota de Souza Filho |
| 2013/0259590 A1 | | 10/2013 | Shaheen |
| 2014/0154023 A1 | | 6/2014 | Craig |
| 2014/0255117 A1 | | 9/2014 | Tseng |
| 2014/0353931 A1 | | 12/2014 | Frota de Souza Filho et al. |
| 2014/0360334 A1 | | 12/2014 | Singer-Schnoeller |
| 2014/0363257 A1 | | 12/2014 | Parker |
| 2015/0147128 A1 | | 5/2015 | Saji |
| 2015/0306686 A1 | | 10/2015 | Mani |
| 2015/0328693 A1 | | 11/2015 | Koga |
| 2015/0360300 A1 | | 12/2015 | Hecht |
| 2016/0067785 A1 | | 3/2016 | Wang et al. |
| 2016/0263664 A1 | | 9/2016 | Son et al. |
| 2017/0028479 A1 | | 2/2017 | Haimer |
| 2018/0065191 A1 | | 3/2018 | Hecht |
| 2018/0169771 A1 | | 6/2018 | Frota de Souza Filho et al. |
| 2019/0126361 A1 | | 5/2019 | Hecht et al. |

FOREIGN PATENT DOCUMENTS

| | | |
|---|---|---|
| CN | 102413974 A | 6/2014 |
| CN | 205020901 U | 2/2016 |
| CN | 103249511 A | 8/2016 |
| CN | 109365844 A | 12/2020 |
| DE | 803143 C | 3/1951 |
| DE | 7043832 U | 3/1971 |
| DE | 19710996 | 12/1999 |
| DE | 19834635 C2 | 7/2001 |

(56) References Cited

FOREIGN PATENT DOCUMENTS

| | | | |
|---|---|---|---|
| DE | 202011050277 | | 7/2012 |
| EP | 0343653 | B1 | 7/1991 |
| EP | 1864733 | A1 | 12/2007 |
| GB | 1341661 | A | 12/1975 |
| JP | 2000084718 | A | 3/2000 |
| JP | 2004261931 | A | 9/2004 |
| JP | 2004306170 | A | 11/2004 |
| JP | 2004330390 | A | 11/2004 |
| JP | 2004330391 | A | 11/2004 |
| JP | 2006272472 | A | 10/2006 |
| JP | 2016193461 | | 11/2016 |
| JP | 2016055353 | A | 10/2018 |
| SE | 516366 | | 4/2001 |
| WO | WO-9634714 | A1 * | 11/1996 ......... B23B 51/0486 |
| WO | WO2006001551 | | 1/2006 |
| WO | WO2009050789 | A1 | 4/2009 |
| WO | WO2011058532 | | 5/2011 |
| WO | WO13033740 | | 3/2013 |
| WO | WO2017207793 | A1 | 12/2017 |

OTHER PUBLICATIONS

Jun. 27, 2019 International Search Report Transmitted.
Feb. 6, 2018 Office action (3 months) 1.
Aug. 8, 2019 Final OA.
Jun. 11, 2018 Non-Final OA.
Chinese Patent Application No_201780076453_4.
Apr. 29, 2020—Non Final Rejection.
Jun. 8, 2021 Office action (3 months) (US Only) US App. No. 20180169771A1.
May 26, 2021 Office Action (non-US) CN App. No. 110062676A.
Apr. 26, 2021 Office Action (non-US) DE App. No. 102019116160A1.
Apr. 14, 2021 Office Action (non-US) DE App. No. 112017006304.
Jan. 15, 2021 Office Action (non-US) CN App. No. 110062676A.
Oct. 22, 2020 Final Office Action (US Only) US App. No. 2020/0180047A1.
Jun. 29, 2020 Office Action (non-US) CN App. No. 108687385A.
Feb. 3, 2020 Exam Notice.
Feb. 14, 2019 Non-Final OA.
Apr. 16, 2018 Search Report International Publication WO App. No. 2018109679A1.
Aug. 31, 2018 Final OA.

* cited by examiner

SIDE-LOCK MODULAR DRILL WITH SPRING-ASSISTED BUMP-OFF

RELATED APPLICATION DATA

The present invention claims priority pursuant to 35 U.S.C. § 119(e) to U.S. Provisional Patent Application No. 62/687,682 filed Jun. 20, 2018 which is incorporated herein by reference in its entirety.

BACKGROUND

A great variety of drills with replaceable cutting tips (or cutting inserts) are known conventionally. Illustrative examples may be appreciated via U.S. Pat. Nos. 7,309,196 and 7,467,915 to Frota de Souza, Filho, and U.S. Pat. No. 9,205,498 to Jaeger. Such drills involve replaceable cutting heads which are mounted on shanks. Typically, though by no means exclusively, the cutting heads and shanks can display continuous and complementing configuration as fluted drills. Each shank will normally include a structure for retaining and rotating an associated cutting head, while the associated cutting head will have a complementing structure for being retained and rotated by the shank.

Often, challenges are encountered conventionally with respect to deformation and failure during the service life of a drill, due (at least in part) to a concentration of stresses imposed on the retaining and drive structure of the shank during ordinary service. This may unduly limit the useful service life of the drill, thus relevant improvements and modifications continue to be sought that might help mitigate the effect of known problems and constraints.

SUMMARY

In accordance with one aspect of at least one embodiment, a rotary cutting tool comprises: a shank; and an interchangeable cutting tip; the shank comprising a pocket which receives the interchangeable cutting tip via an interference fit; the pocket comprising two centering wall portions which, when viewed along a central longitudinal axis of the shank, are oriented at a non-zero angle with respect to one another; the interchangeable cutting tip being axially displaceable between: an initial position, which is assumed by the interchangeable cutting tip upon being received in the pocket of the shank; a clamped position, wherein the interchangeable cutting tip is fixedly held with respect to the shank; and a bump-off position, wherein the interchangeable cutting tip is not fixedly held with respect to the shank; a holding element which holds the interchangeable cutting tip in the clamped position; and a spring assembly which displaces the interchangeable cutting tip between the clamped position and the bump-off position.

In accordance with another aspect of at least one embodiment, a shank for a rotary cutting tool comprises: a pocket which receives an interchangeable cutting tip via an interference fit; the pocket comprising two centering wall portions which, when viewed along a central longitudinal axis of the shank, are oriented at a non-zero angle with respect to one another; a holding element for holding an interchangeable cutting tip in a clamped position; and a spring assembly for displacing an interchangeable cutting tip between a clamped position and a bump-off position.

For a better understanding of exemplary embodiments, together with other and further features and advantages thereof, reference is made to the following description, taken in conjunction with the accompanying drawings, and the scope of the claimed embodiments will be pointed out in the appended claims.

DETAILED DESCRIPTION

It will be readily understood that the components of embodiments, as generally described and illustrated in the figures herein, may be arranged and designed in a wide variety of different configurations in addition to the described exemplary embodiments. Thus, the following more detailed description of the embodiments, as represented in the figures, is not intended to limit the scope of the embodiments, as claimed, but is merely representative of exemplary embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments. One skilled in the relevant art may well recognize, however, that embodiments can be practiced without at least one of the specific details thereof, or can be practiced with other methods, components, materials, et cetera. In other instances, well-known structures, materials, or operations are not shown or described in detail to avoid obscuring aspects of one or more embodiments.

The description now turns to the figures. The illustrated embodiments will be best understood by reference to the figures. The following description is intended only by way of example and simply illustrates certain selected exemplary embodiments as claimed herein.

Figure 1:
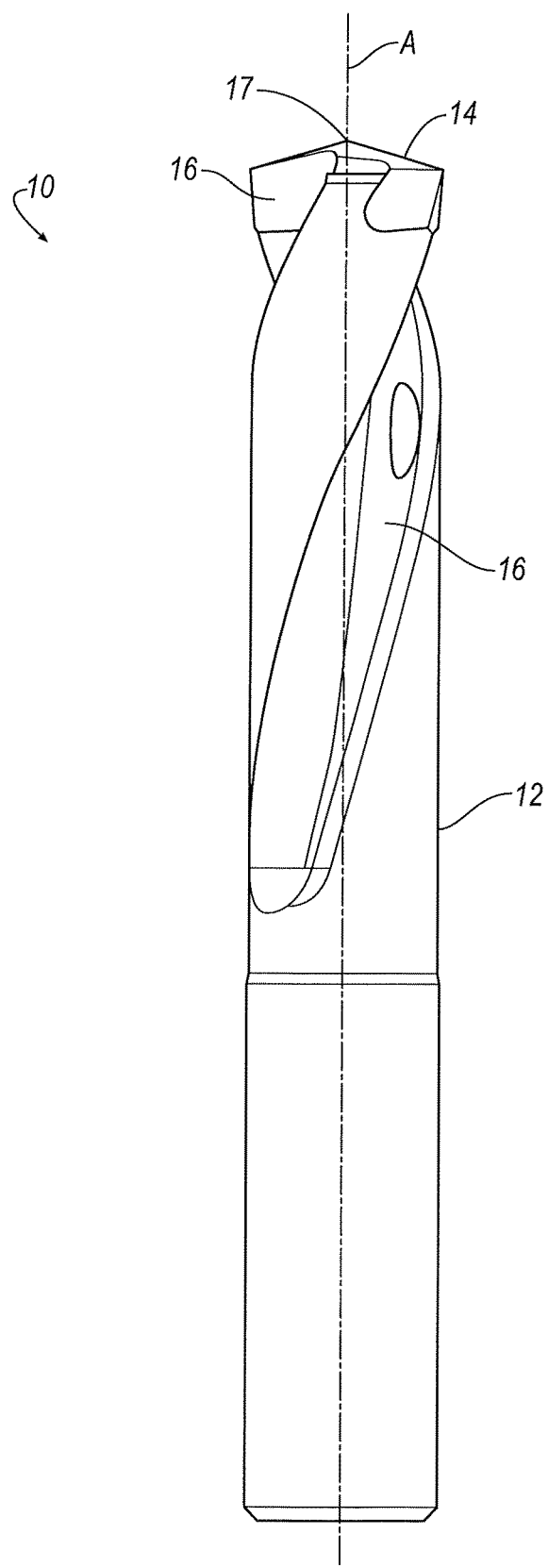
FIG. 1 provides an elevational view of a rotary cutting tool which includes a shank and an interchangeable cutting insert.

FIG. 1 shows a rotary cutting tool 10 in the form of a drill, having a shank 12 and a cutting insert 14, which are both produced as separate parts. The cutting insert 14 can be fastened to, or installed on, the shank 12 in a detachable and interchangeable manner. Similarly, the rotary cutting tool, for performing rotary cutting operations on a workpiece, can also be designed as a countersinking, milling or reaming tool. For purely illustrative purposes, the cutting tool 10 shown in FIG. 1 is a twist drill which includes a pair of helical flutes 16 disposed along the sides of the drill, in diametric opposition to one another. Each flute 16 extends over the shank 12 and the cutting insert 14, wherein the latter also includes a drill point 17.

Generally, a central longitudinal axis A is defined through the cutting tool 10 (common to both the shank 12 and the cutting insert 14), about which the cutting tool 10 rotates during operation. A "cutting insert" may alternatively be referred to, herein and elsewhere, with any of a variety of other suitable terms such as "tip", "insert", "head", "cutting tip" or "cutting head".

It should be noted that each flute 16, as shown in FIG. 1, includes portions that are disposed in both the shank 12 and the cutting insert 16 alike. Thus, once cutting insert 14 is installed on shank 12, corresponding flute portions in the cutting insert 14 and shank 12, alike, will align to form flutes 16 that are generally continuous and undistorted. Although two flutes 16 are depicted herein, it should be understood that any number of flutes (including only one) is possible.

Figure 2:
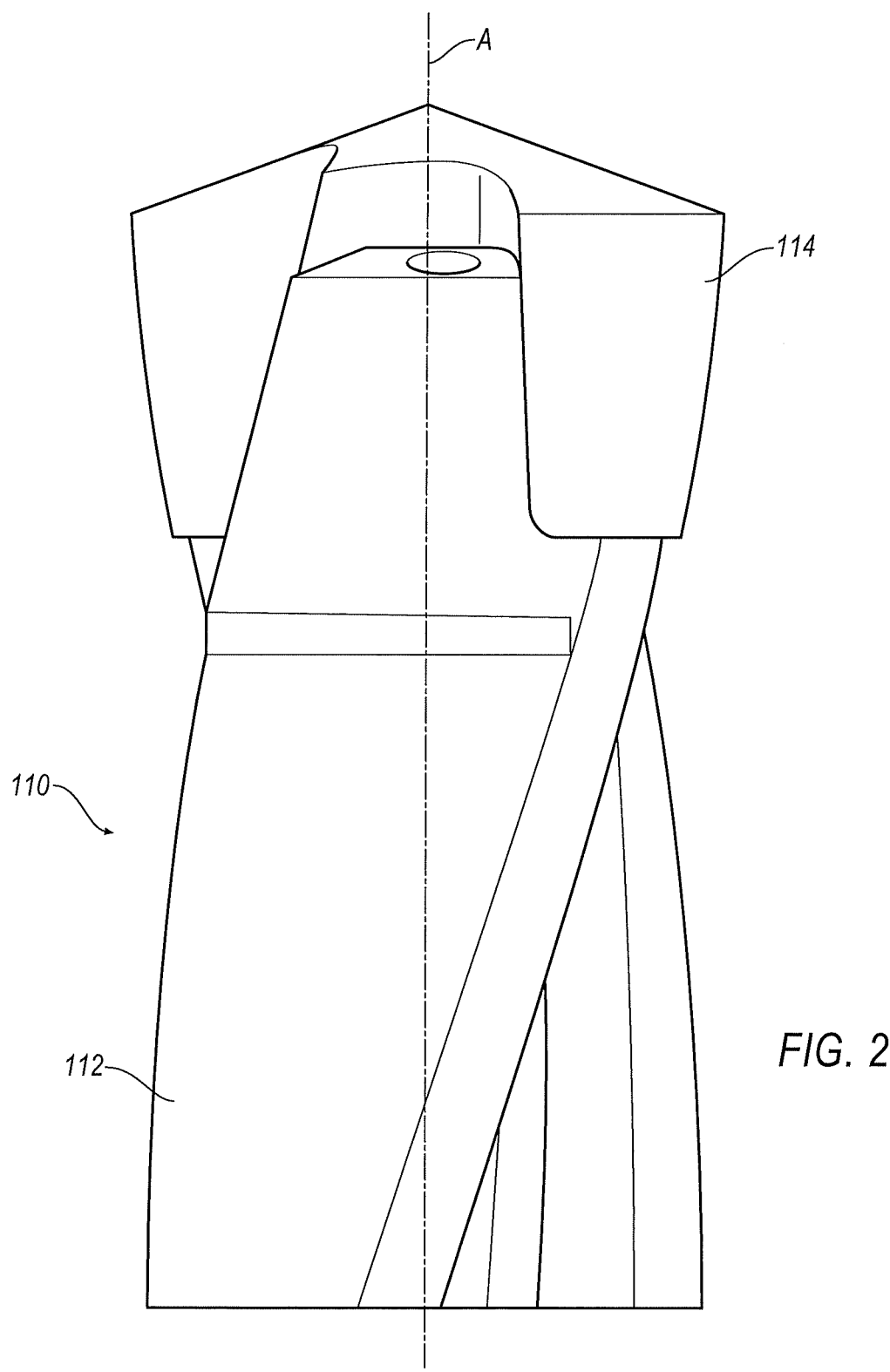
FIG. 2 provides an elevational view of a shank and cutting insert in a cutting tool 110.

FIG. 2 provides an elevational view of a shank 112 and cutting insert 114 in a cutting tool 110, in accordance with at least one embodiment. As shown, the cutting insert 114 is fixedly positioned at an axial end of the shank 112, in preparation for operation. Further details of a shank and cutting insert in accordance with at least one embodiment will be better appreciated from the ensuing discussion.

In the depiction of FIG. 2, cutting head 114 emerges at a leading end of cutting tool 110. A "leading end", defined herein for semantic purposes, represents that end which engages a work piece when cutting. During cutting operations, cutting tool 110 is rotated, and advanced progressively into a workpiece as cutting progresses. That end of cutting tool located oppositely to the leading end can be referred to as the "trailing end". The terms "leading end" and "trailing end" are semantic devices which apply equally to shank 12 and cutting head 14 as they connote directional orientation with respect to longitudinal axis A rather than specific structure.

Figure 3:
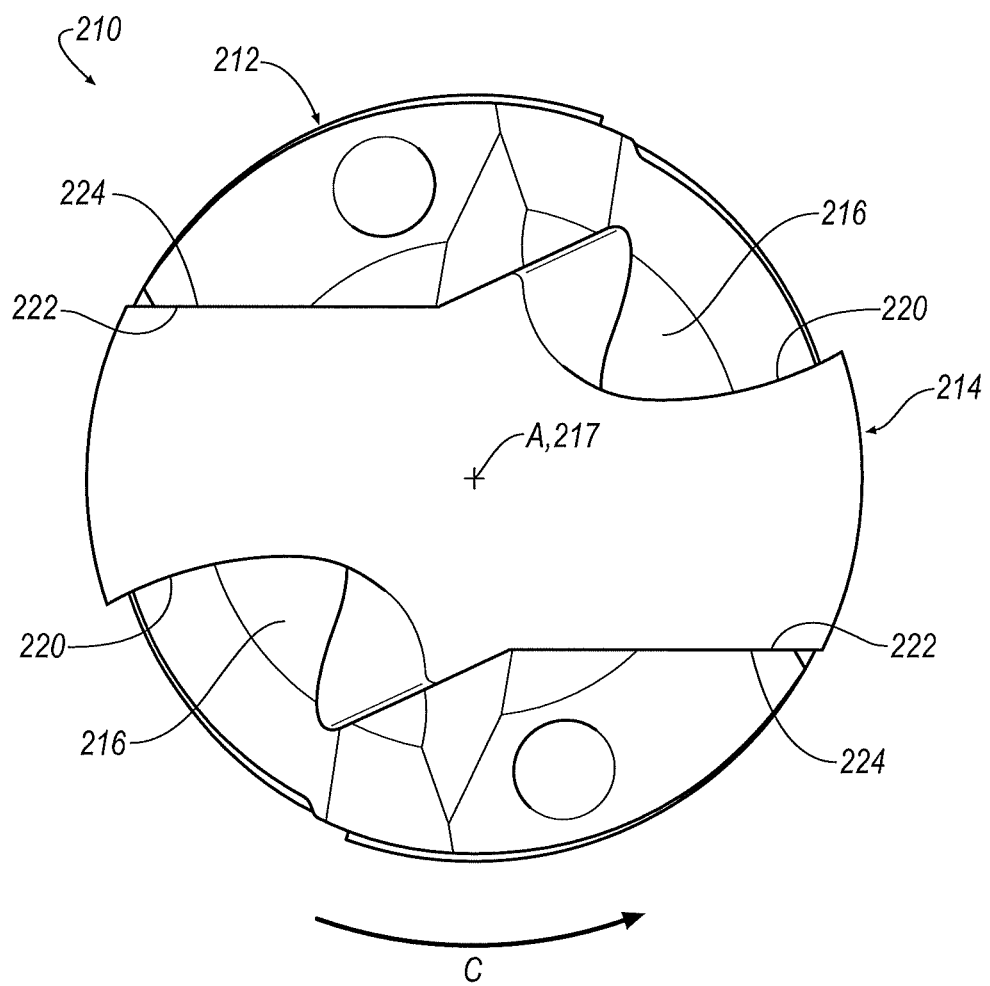
FIG. 3 provides a plan view of a conventional cutting tool with a shank, and a cutting insert installed therein.

By way of general comparison in accordance with at least one embodiment, FIG. 3 provides a plan view of a conventional cutting tool 210 with a shank, and a cutting insert installed therein. As shown, the insert 214 is mounted at an axial end of the shank 212, for engaging in a cutting operation when the cutting tool 210 is rotated about longitudinal axis A in a counter-clockwise cutting direction C (when viewed with respect to FIG. 3). The tool 210 includes a pair of flutes 216 defined via mutual positioning of the shank 212 and insert 214 with respect to one another. The insert 214 is received in a pocket of the shank 212 via an interference fit.

Cutting insert 214 includes a pair of cutting edges 220, each disposed adjacent to a respective flute 216. As can be appreciated, the cutting edges 220 will cut into a workpiece as the drill 210 is rotated in cutting direction C when engaging a workpiece. For the purpose of rotatably driving the cutting insert 214, the same includes two drive surfaces 222 that are dimensioned and disposed in a manner to be engaged by compatible torque transmission walls 224 of the shank 212. The drive surfaces 222 and torque transmission walls 224, alike, are usually each oriented along a plane that is essentially parallel with respect to longitudinal axis A. Though not explicitly illustrated here, rotation of the entire cutting tool 210 can be actuated via a separate driving element, such as a hand drill, drill press or machine tool, which causes the shank 212 to rotate.

As such, with the conventional arrangement illustrated in FIG. 3, the walls 224 and drive surfaces 222 alike are oriented in a direction (as shown in the figure) that results in a torque transmission force that is largely directed perpendicularly to the walls of the aforementioned pocket (that receives the insert 214 via interference fit). It has been found that this torque transmission force can produce significant stresses in critical regions of the shank 212 due to bending, thus representing a significant place for improvement. For centering and stability, To the extent that the insert 214 is mounted with an interference fit for a purpose of centering and stability, it can be appreciated that elastic deformation of the walls 224 creates stresses in the same areas as stresses caused by torque transmission. As will be appreciated more fully herebelow, broadly contemplated herein are arrangements for a drill where, advantageously, an interference fit is provided between an insert and a shank wherein high torque transmission capability is achieved by positioning the drive walls at a smaller angle (than is the case in FIG. 3) with respect to pocket centering walls.

Figure 4:
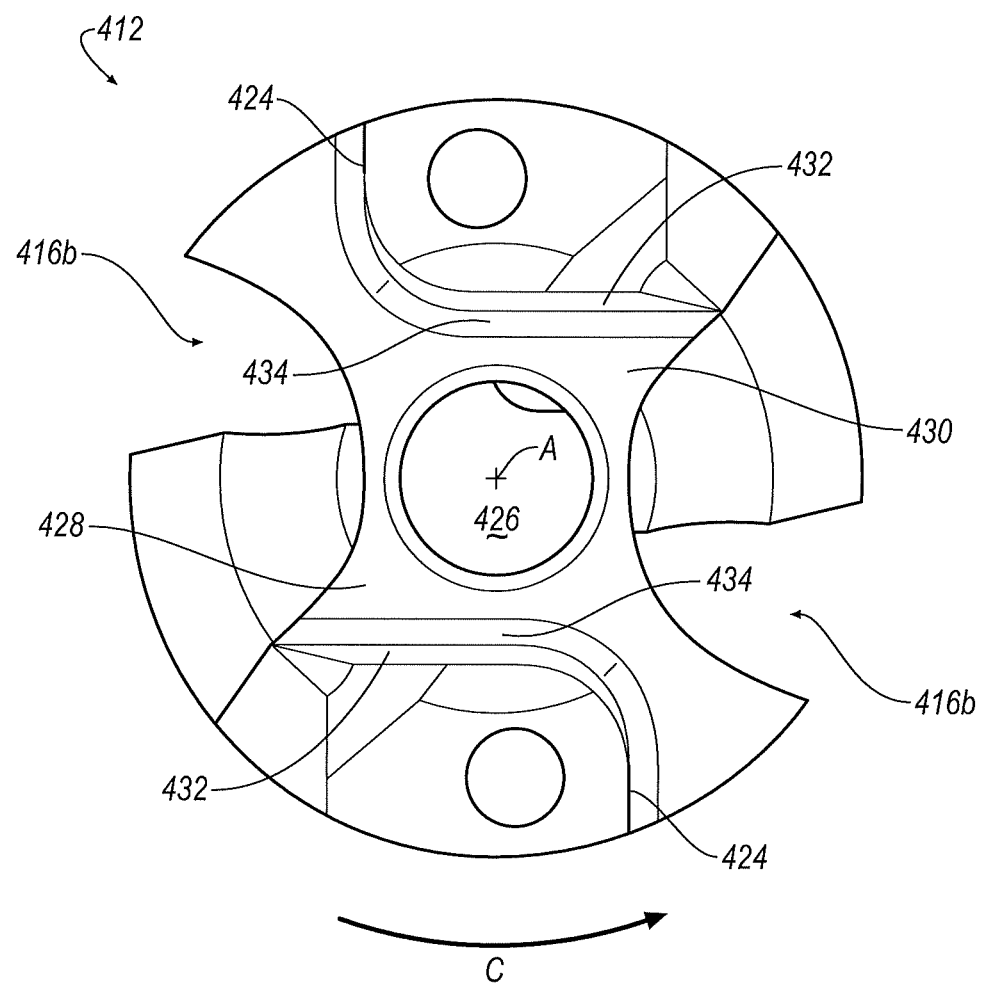
FIG. 4 provides a plan view of a shank.

FIG. 4 provides a plan view of a shank 412 in accordance with at least one embodiment. A pair of flute portions 416b are defined in the shank and are configured to interface with compatible flute portions of a cutting insert. Shank 412 includes a pocket 428 for accommodating a cutting insert; the principal elements of the latter include two centering walls 432 interconnected by a floor 430. The floor 430 can be oriented transversely with respect to central longitudinal axis A. Any or all of central floor portion 430 and centering walls 432 serve as abutment surfaces which contact a cutting insert when the cutting insert is installed on shank 412. As shown, a central (blind) hole or opening 426 is disposed centrally in the floor 430 (about axis A), and is configured to receive a centering pin of a cutting insert.

In a manner to be appreciated more fully below, the centering walls 432 deform to receive compatible portions of a cutting insert via an interference fit. Preferably, the centering walls 432 (or at least a portion thereof) are each inclined at an angle with respect to the central longitudinal axis A, inclined away from axis A in progressing toward a leading end of the shank 412. In accordance with at least one embodiment, as shown in FIG. 4, centering walls 432 are substantially straight (while inclined as noted), and parallel to one another, when viewed in a given, single horizontal plane that is transverse to axis A. (Here, it can also be understood that the centering walls 432 would, by extension, also be inclined with respect to that plane transverse to the axis A.)

In accordance with at least one variant embodiment, centering walls 432 may each be curved when viewed in a given, single horizontal plane that is transverse to axis A. In such variants, merely by way of illustrative and non-restrictive example, each wall 432 may be oriented along an arc that is substantially parallel to a circumference of the greater shank 412. Accordingly, taken together, such walls 432 would trace a generally frustoconical shape, narrowing as a function of proximity (in an axial direction) to the pocket floor 430.

Also shown in FIG. 4 are torque transmission walls 424 which, unlike the conventional example of FIG. 3, are configured and disposed to transmit a force to compatible drive surfaces of a cutting insert in a in a direction substantially parallel to the centering walls 432 This represents a significant improvement over the conventional example of FIG. 3, in that stresses produced in each of several critical areas of the pocket 428, of other portions of the shank 412, and of a cutting insert mounted therein, are considerably reduced.

Further advantages may be found in connection with insertion of a cutting insert into pocket 428. Here, to the extent that centering walls 432 end up deflecting radially outwardly with respect to axis A, such deflection may be transmitted to the torque transmission walls 424. However, in so doing, the torque transmission walls will deflect virtually in parallel to a radial direction with respect to axis A or very close thereto, essentially along their own horizontal dimension (that is, their dimension that is transverse to the axis A). This helps maintain face-to-face contact with drive surfaces of the cutting insert being clamped. In contrast, with a conventional arrangement such as that shown in FIG. 3, the torque transmission walls 224 therein shown will more or less deflect in a radial direction with respect to axis A, thus jeopardizing full face-to-face contact with cutting insert drive surfaces (such as those indicated at 222 in FIG. 3).

In the arrangement shown in FIG. 4, torque transmission walls 424 are oriented in parallel with respect to the central longitudinal axis A, when viewed in a generally longitudinal direction. In at least one variant embodiment, the walls 424 may be inclined with respect to the central longitudinal axis A (e.g. at an angle of between about 0 and about 10 degrees, preferably between about 2 and about 6 degrees, and/or may match the inclination of centering walls 432), in a direction opposite to the rotational cutting direction C of the shank 412, toward the leading end of the shank 412). (Here, it can be understood that in such a variant the torque transmission walls 424 would, by extension, also be inclined with respect a plane transverse to the central longitudinal axis.) Shallow semi-cylindrical troughs 434 may run along a bottom of each of the centering walls 432 and torque transmission walls 424, respectively; the troughs 434 can assist in reducing the stresses applied to the pocket 428 and to an insert alike.

In accordance with the aforementioned variant embodiment, when walls 424 are inclined with respect to axis A, it should be noted that when an insert is first positioned in the pocket 428, before clamping, the centering walls 432 and corresponding surfaces on the insert will make contact; there will be a gap between the insert and pocket floor 430 at that point. At the same time, there will be exist at that point another gap (though a significantly smaller one) between drive surfaces of the insert (e.g., such as drive surfaces 722 of the insert 714 shown in FIGS. 7A and 7B) and torque transmission walls 424. In this manner, when the insert is clamped and the centering walls 432 expand outwardly, the torque transmission walls 424 and corresponding drive surfaces on the insert may come into contact before any torque is applied to the insert (e.g., as may be applied in a subsequent drilling operation).

Generally, it can be appreciated with regard to various embodiments herein that an insert, when fully clamped in a shank (such as 412), the insert may contact the pocket floor 430, or there may indeed be a small gap between a bottom portion of a main head portion of the insert and the floor 430. Accordingly, while various views herein may not explicitly illustrate such a gap (e.g., for general ease of illustration), it should be understood and appreciated that such a gap can be considered to be present in accordance with one or more embodiments and/or variants.

Figure 5:
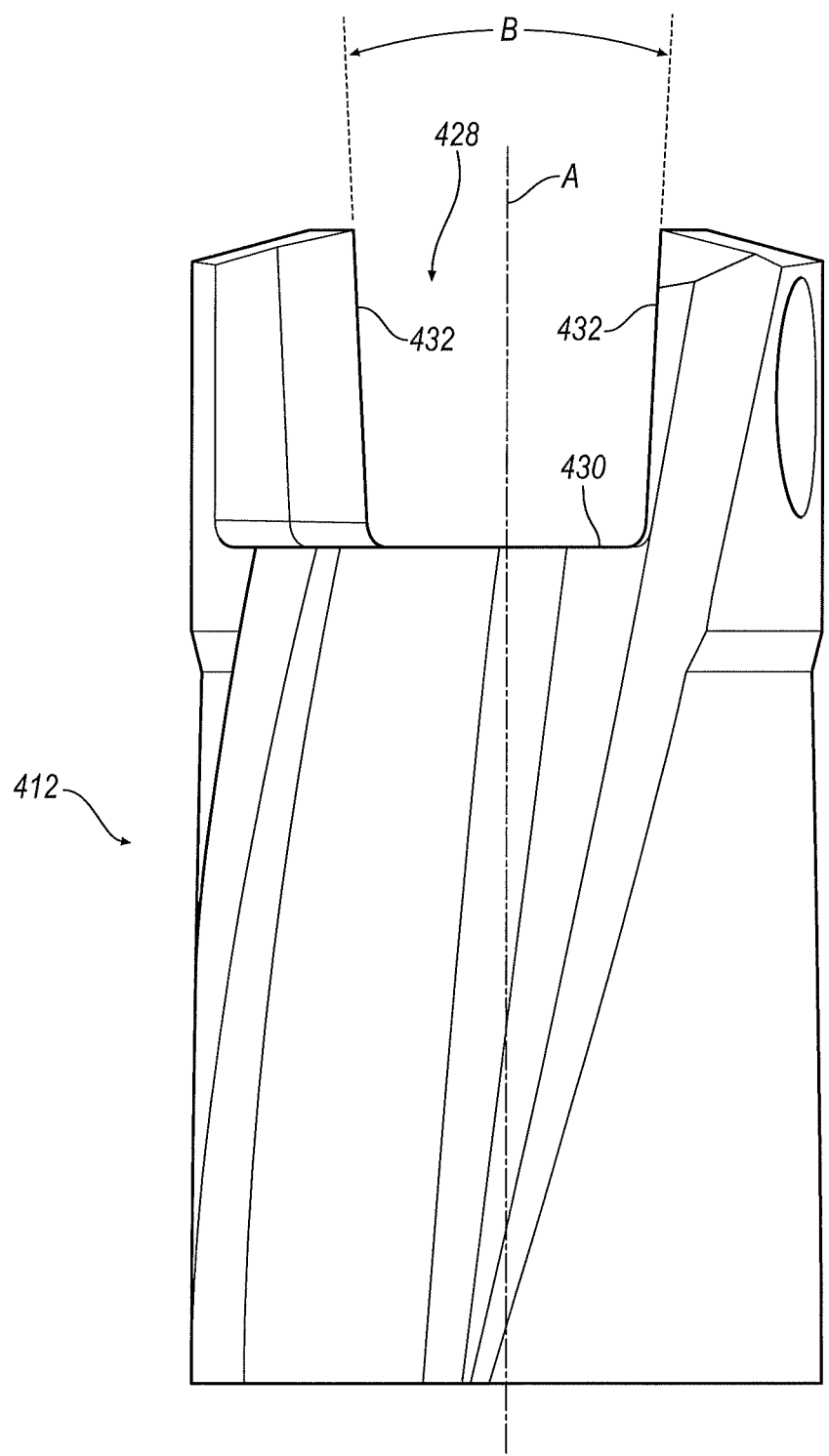
FIG. 5 provides an elevational view of the shank of FIG. 4.

FIG. 5 provides an elevational view of the shank 412 of FIG. 4. As shown, the centering walls 432 can be inclined symmetrically with respect to axis A and at a mutual angle B with respect to one another. The angle B could represent an angle of between about 3 and about 6 degrees, or alternatively could be defined as imparting to each wall 432 a slope of between about 1:20 and about 1:10. It should be understood and appreciated that, when being installed, a cutting insert initially will sit on centering walls 432 at a distance from the pocket floor 430 before it is fully clamped within the pocket 428. Accordingly, elastic deformation of the centering walls 432 will occur as the insert is pulled against the floor 430. (Further details relating to a clamping action, in accordance with at least one embodiment, will be better appreciated from the discussion further below.)

It can be further appreciated, in accordance with at least one embodiment, that with angled centering walls 432 as discussed above, interference caused upon initial insertion of a cutting insert will give rise to a relatively small displacement that then will be needed in fully clamping the insert within pocket 428 and in bumping-off the insert in order to then remove the insert. This stands in stark contrast to conventional arrangements with straight centering walls (relative to axis A) which typically give rise to a relatively larger displacement needed for fully clamping an insert within a pocket, and in then bumping-off the insert.

In accordance with at least one embodiment, as shown in FIG. 5, substantially the entirety of each centering wall 432, extending axially upwardly from the pocket floor 430 to the leading end of shank 412, is inclined as shown. In accordance with at least one variant embodiment, a lower portion of each centering wall 432 (i.e., a portion axially closer to pocket floor 430) is either not inclined at all (i.e., is parallel) with respect to axis A or is inclined at a different angle with respect to axis A than is an upper portion of each centering wall 432. In such variants, the upper portions of centering walls 432 can be understood to assume the angle B discussed above, and would still represent surfaces initially contacted by an insert, as the insert is received in pocket 428. In such variants, preferably at least about 50 to 75 percent of the axial extent of each centering wall 432 is represented by an upper portion which is inclined to assume the angle B discussed above.

Figure 6:
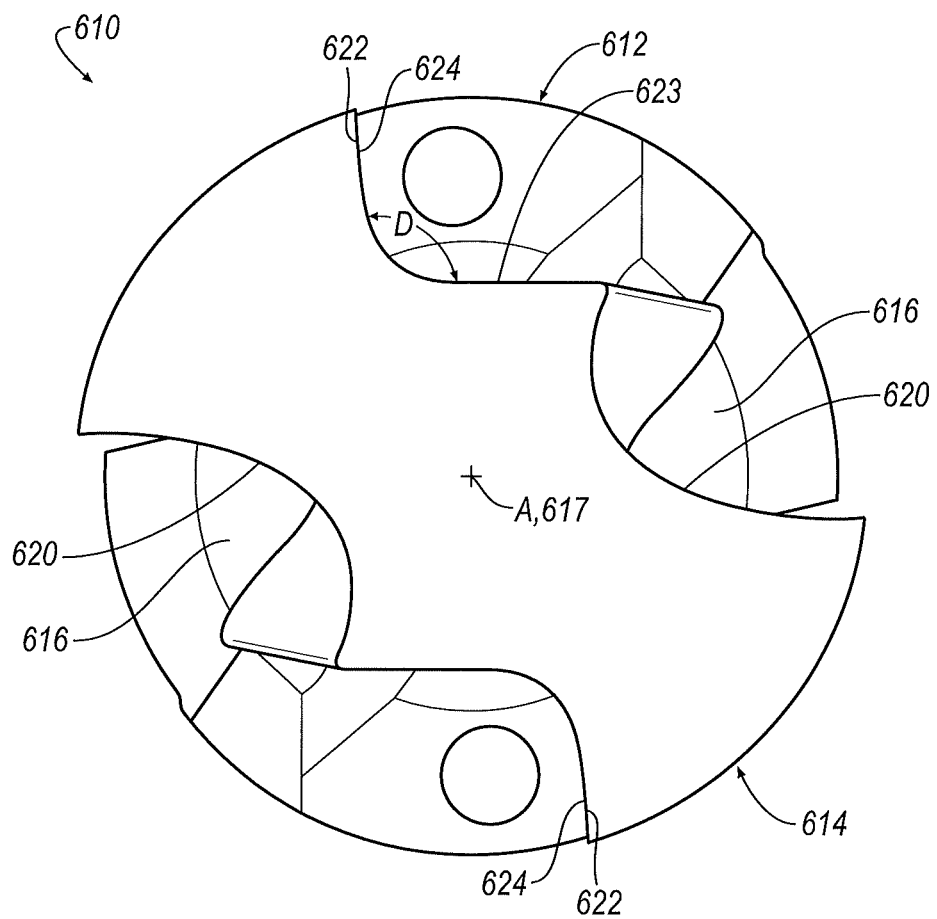
FIG. 6 provides a plan view of a shank and cutting insert installed therein.

FIG. 6 provides a plan view of a shank 612 and cutting insert 614 installed therein, in accordance with at least one embodiment. As shown, the cutting insert 614 includes drive surfaces 622 that are oriented to be compatible with torque transmission walls 624 of the shank 612. Preferably, when viewed transversely with respect to axis A (as indeed shown in FIG. 6), surfaces/walls 622 and 624 alike can be oriented such that a driving force is transmitted generally in a direction substantially parallel to the centering walls. As such, surfaces/walls 622 and 624 alike can be oriented at an angle D with respect to centering walls of the shank 612 (such as those indicated at 432 in FIGS. 4 and 5), and thus to a corresponding surface or side 623 of insert 614. By way of illustrative example, D could be between about 75 and about 120 degrees, or preferably between about 85 and about 100 degrees; most preferably, D can be approximately 90 degrees. It should be appreciated, in this vein, that a workable balance can preferably be found in choosing angle D, in that larger angles will tend reduce to stresses on insert 614 and increase stresses on the pocket (defined via centering walls of the shank 612), while smaller angles will tend to reduce stresses on the pocket (of shank 612) and increase stresses on the insert 614. It should be further appreciated that an arrangement such as that shown in FIG. 6 stands in stark contrast to that shown in FIG. 3, where an angle analogous to D would be well over 120 degrees, not even far from 180 degrees.

Generally stated, in accordance with at least one embodiment, the torque transmission walls 624 (and preferably the drive surfaces 622, when insert 614 is mounted in shank 612) can each be oriented at a predetermined angle (e.g., angle D) with respect to a defining dimension of at least one centering wall portion of shank 612 (which may be analogous to one or more centering walls such as those indicated at 432 in FIGS. 4 and 5). If the at least one centering wall portion is substantially straight when viewed in a given, single horizontal plane that is transverse to axis A, the defining dimension can be understood as a dimension in parallel with respect to the at least one centering wall portion. If, in accordance with at least one variant embodiment as described further above, the at least one centering wall portion is curved when viewed in a given, single horizontal plane that is transverse to the axis A (and, e.g., along an arc that is substantially parallel to a circumference of the greater shank 612), then the defining dimension can be understood as a tangent of the curvature of the at least one centering wall portion at a midpoint of the at least one centering wall portion.

Figure 7A:
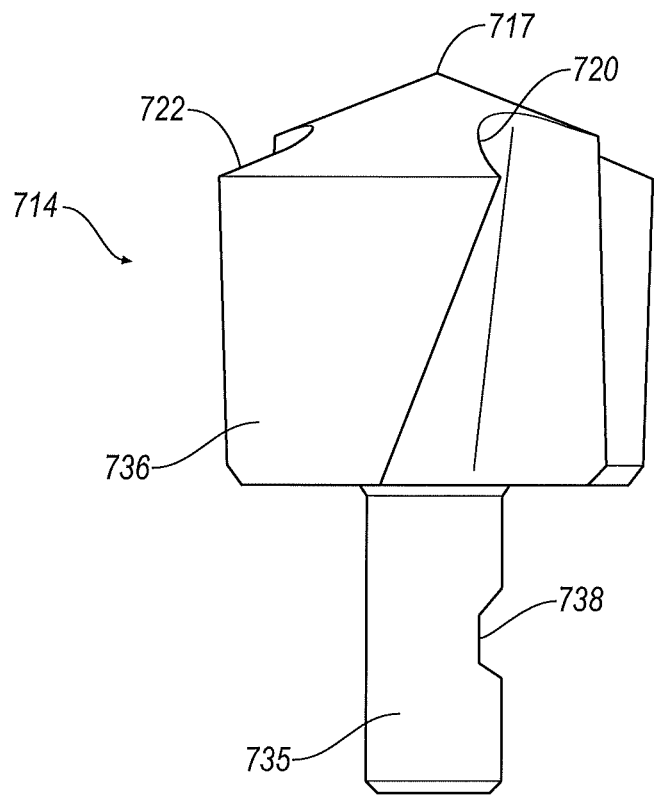
FIG. 7A provides an elevational view of a cutting insert.

FIG. 7A provides an elevational view of a cutting insert 714, in accordance with at least one embodiment. As shown, a generally cylindrical centering pin 735 extends axially away from a main head portion (or head) 736. A recess (or notch) 738 is provided in the shaft portion 735 to accommodate a setscrew, in a manner to be more fully appreciated herebelow. Such a recess can be configured in any suitable manner; by way of illustrative and non-restrictive example (and indeed as shown in FIG. 7A), it could be defined by a relatively flat surface oriented in parallel to a chord or secant defined by the cylindrical pin 735, flanked on the two axial sides by angled surfaces, one per side, that converge on the flat surface from an external circumference defined the pin 735. Also shown in FIG. 7A are cutting edges 720, drive surfaces 722 and a cutting tip 717 which may be regarded as analogous to similar components described and illustrated elsewhere herein. In a variant embodiment, two symmetrical notches/recesses 738 may be provided, disposed diametrically opposite from one another with respect to shaft portion 735.

Figure 7B:
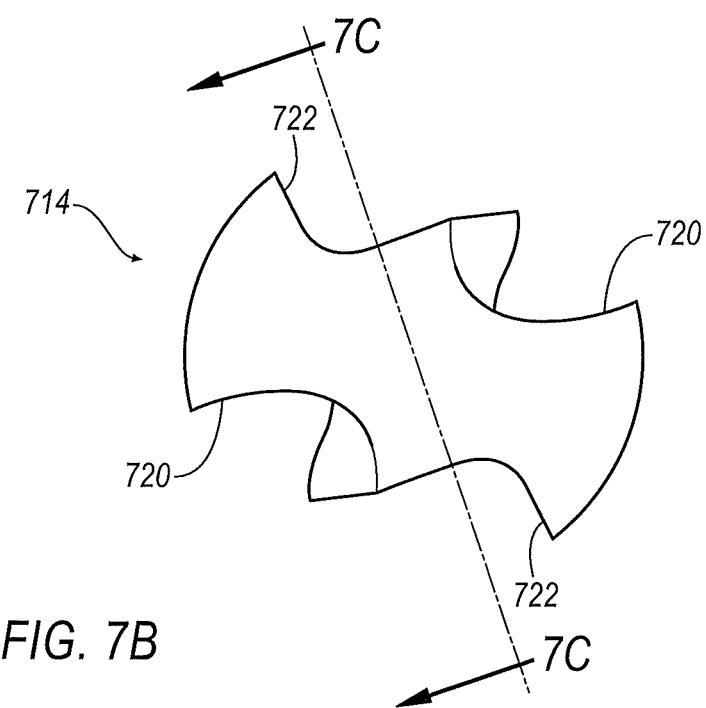
FIG. 7B provides a plan view of the cutting insert of FIG. 7A.

FIG. 7B provides a plan view of the cutting insert 714 of FIG. 7A. As shown, the drive surfaces 722 may be oriented in similar fashion to those indicated at 622 in FIG. 6.

Figure 7C:
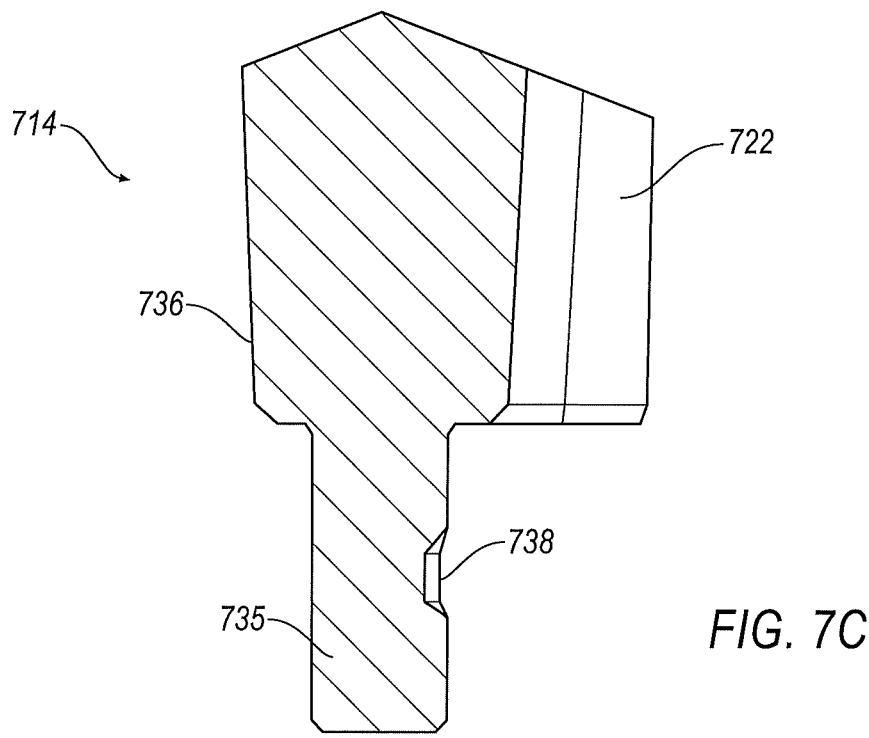
FIG. 7C provides an axial section taken through the line 7C-7C in FIG. 7B.

FIG. 7C provides an axial section taken through the line 7C-7C in FIG. 7B. Here, in particular, some viable proportional dimensions of recess 738 are shown.

Figure 7D:
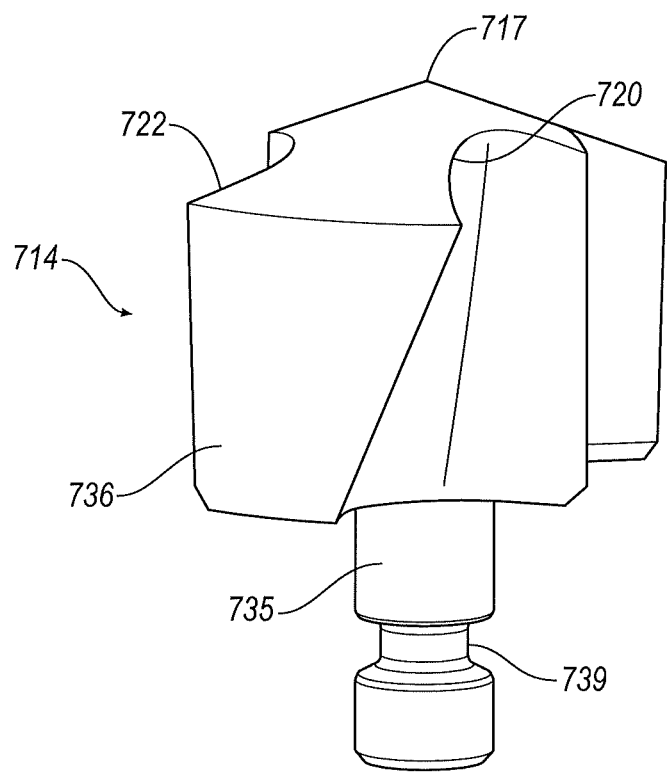
FIG. 7D provides an elevational view of a cutting insert, in accordance with at least one variant embodiment.

FIG. 7D provides an elevational view of a cutting insert 714, in accordance with at least one variant embodiment. Here, in place of the recess/notch 738 from FIGS. 7A-7C, there is an annular groove 739 for accommodating a setscrew. As shown, annular groove 739 may be recessed into centering pin 735 about an entire circumference of pin 735. Groove 739 may further be defined, substantially as shown, by an inner cylindrical surface (of lesser diameter than the remainder of centering pin 735 itself), flanked on the two axial sides by frustoconical surfaces, one per side, that converge on the inner cylindrical surface from an external circumference defined by the pin 735.

The disclosure now turns to a description of embodiments of a shank and cutting insert with spring-assisted bump-off. Components appearing similar to those in earlier figures may be understood as being similarly designated, though labels indeed are included in several of the drawings whose descriptions now follow. Reference is variously made herebelow, and in the drawings, to a "spring assembly" and/or a "spring component". A "spring assembly" may be understood as including at least a "spring component", which itself essentially may be embodied by a component (e.g., structurally coiled or kinked) which is capable of providing a spring force. A "spring assembly" may also additionally include an "upper interface portion" (as described herebelow), which itself may be integral with (i.e., formed in one piece with) a spring component or a separate component with respect to a spring component. A "spring component" is also variously referred to herebelow, in accordance with at least one embodiment, as a "bump-off spring".

Generally, in accordance with at least one embodiment as broadly contemplated herein, a drill body (or shank) has slightly angled pocket walls. An interchangeable cutting insert has a centering pin with a notch to engage with a side screw. When the side screw is rotated and contacts the centering pin, a force is generated moving the insert by a short distance in the axial direction, causing elastic deformation of pocket walls, until the cutting insert contacts the bottom of the pocket (or pocket floor). As the side screw is activated during clamping (i.e., displaced toward a central longitudinal axis of the shank), a deformable element (e.g. a spring-like element which is added to the shank or built integrally with respect thereto) with a high spring constant is compressed, storing energy that can be used to push the insert out once the side screw is retracted away from the central longitudinal axis of the shank.

Generally, in accordance with at least one embodiment as broadly contemplated herein, the aforementioned spring-like element can be actuated by a clamping pin of the cutting insert as the clamping pin during clamping. In one embodiment, the spring-like element can by the side screw prior to clamping. This could involve a lower clamping torque being applied to the side screw, and lower contact forces between the side screw and the clamping pin.

The features discussed and contemplated just above, and variants thereof, will be better appreciated and understood from the ensuing discussion.

Figure 8:
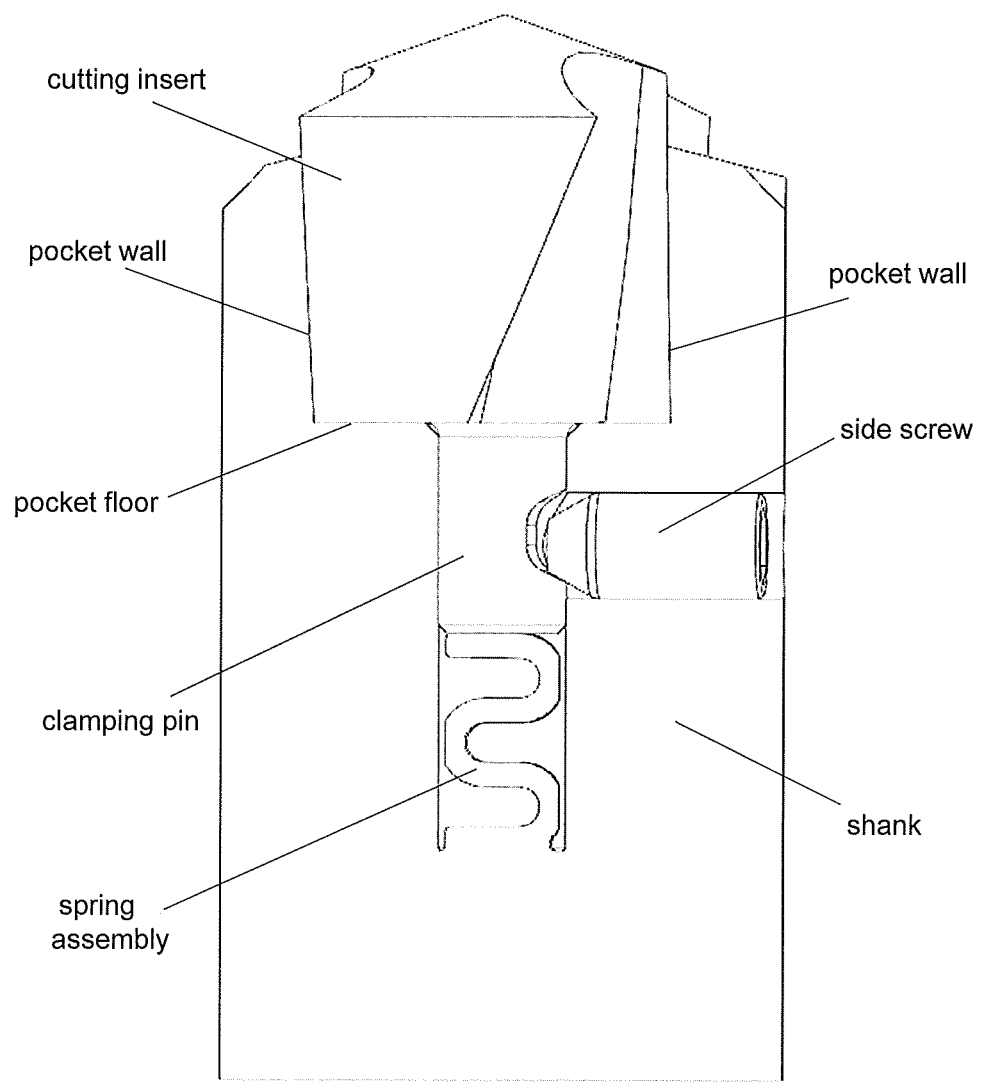
FIG. 8 provides a cut-away elevational view showing a first embodiment of a shank and cutting insert, with spring-assisted bump-off.

FIG. 8 provides a cut-away elevational view showing a first embodiment of a shank and cutting insert, with spring-assisted bump-off. As shown, a bump-off spring (or spring component, or spring assembly constituted solely by a spring component) is located in a central hole (or cavity) axially below the cutting insert (particularly, below the clamping pin thereof) and makes contact with the cutting insert/clamping pin. Also shown is a side screw (or alternatively, "setscrew") which is displaceable within its own channel (e.g., via mutual threaded engagement).

When initially installed, the cutting insert seats on side walls of the shank "pocket" at a small distance from the pocket floor. When the side screw (or setscrew) is "activated", i.e., displaced from right to left in the drawing, it creates a force on clamping pin that in turn causes elastic deformation of the angled pocket walls (themselves, described in more detail heretofore). Also, this causes elastic deformation (compression) of the bump-off spring. When the side screw is displaced in the opposite direction (left to right in the drawing), the bump-off spring pushes the cutting insert axially upwardly to release the latter from the pocket. In other words, the spring force is sufficiently strong to overcome frictional forces between the pocket walls and the exterior of the cutting insert. It should be appreciated that the bump-off spring in such a context will have a high constant value, not conventionally achievable via coil-type springs. By way of a non-restrictive and illustrative working example, the axial displacement involved for the cutting insert is relatively small, e.g., in a range of 0.3-0.5 mm for a 16 mm drill, with the spring force ranging, e.g., from 2000 to 3000 N. The bump-off spring may be formed from ALM (additive layer manufacturing) or other suitable technique.

Figure 9:
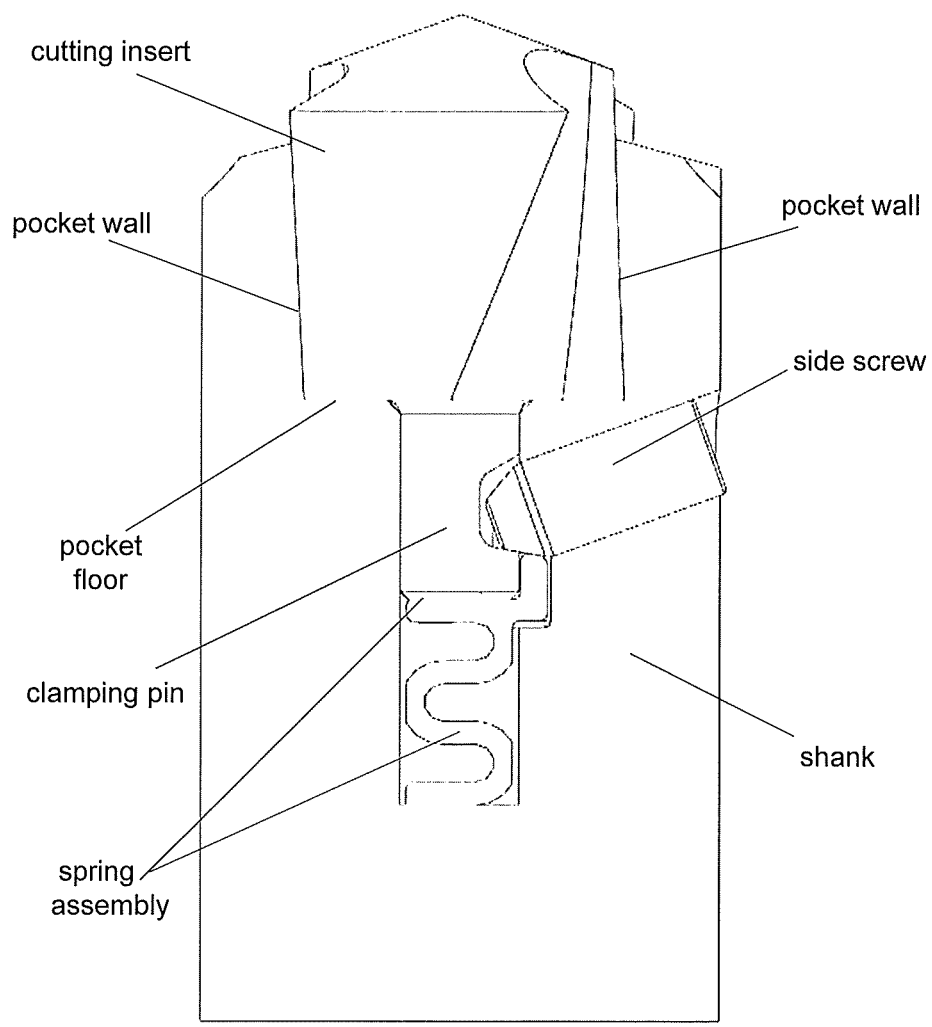
FIGS. 9 and 10, respectively, provide cut-away elevational views of first and second variants, respectively, of a second embodiment of a shank and cutting insert, with spring-assisted bump-off.
Figure 10:
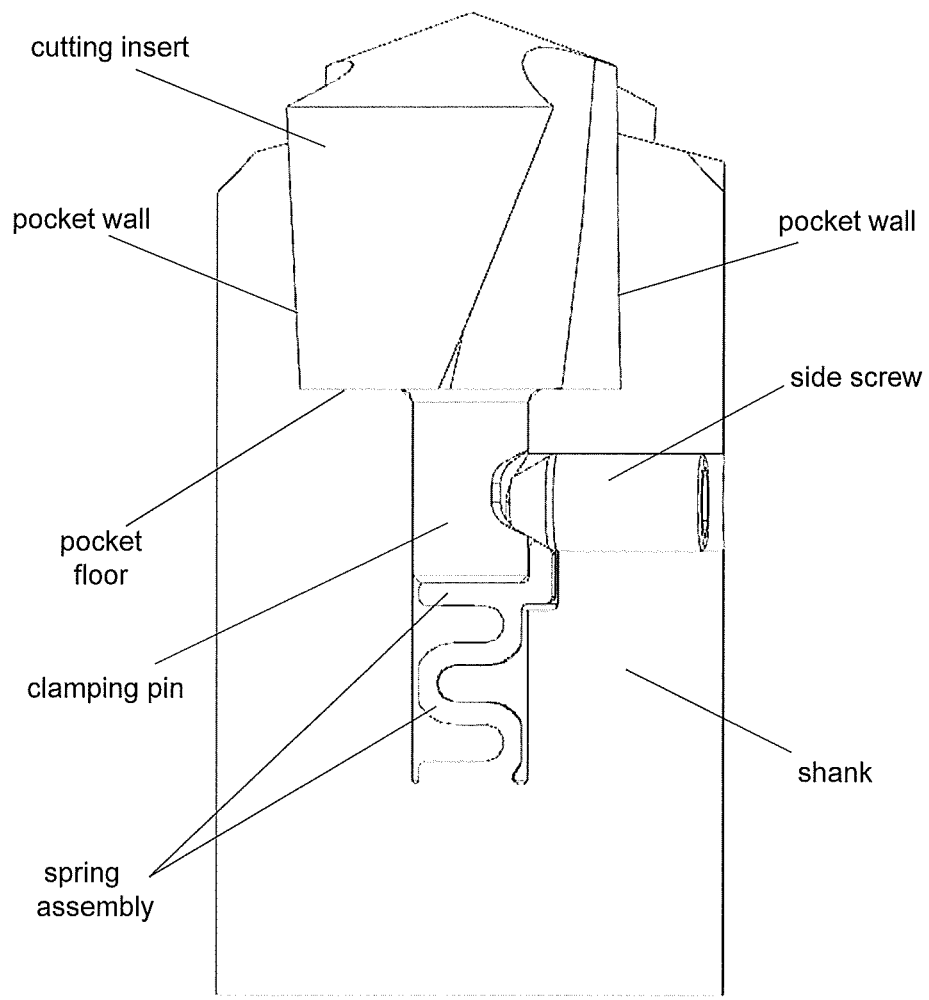

FIGS. 9 and 10, respectively, provide cut-away elevational views of first and second variants, respectively, of a second embodiment of a shank and cutting insert, with spring-assisted bump-off. Similarly to the embodiment of FIG. 8, the cutting insert seats on the side walls of the shank pocket at a small distance from pocket floor. The spring assembly, however, is different in this embodiment as it includes a spring component as well as an upper interface portion (appearing as a reverse "L" in both of FIGS. 9 and 10), which itself contacts not only a lowermost portion of the cutting insert (and associated clamping pin) but also a surface of the side screw (at least, when the side screw is in a position to be so contacted).

Again, in both variants shown in FIGS. 9 and 10, the side screw is activated (i.e., displaced generally right to left with respect to both drawings) and compresses the spring assembly first and then pushes the insert axially downwardly against the pocket floor. When the side screw is displaced or rotated to the opposite direction, i.e., generally left to right in the drawings, the spring component of the spring assembly acts axially upwardly with its associated force and the cutting insert is gradually released from the pocket. Again, as described already with respect to FIG. 8, the spring force involved is sufficient to overcome frictional forces to push the insert out. Also, as with the embodiment of FIG. 8, the entire spring assembly in each of FIGS. 9 and 10 may be formed from ALM or another suitable technique. FIG. 9, for its part, shows the side screw being disposed at an angle with respect to a horizontal plane (itself, disposed transversely to a central longitudinal axis of the insert and shank) while FIG. 10 shows the side screw being disposed horizontally with respect to the same horizontal plane.

Figure 11:
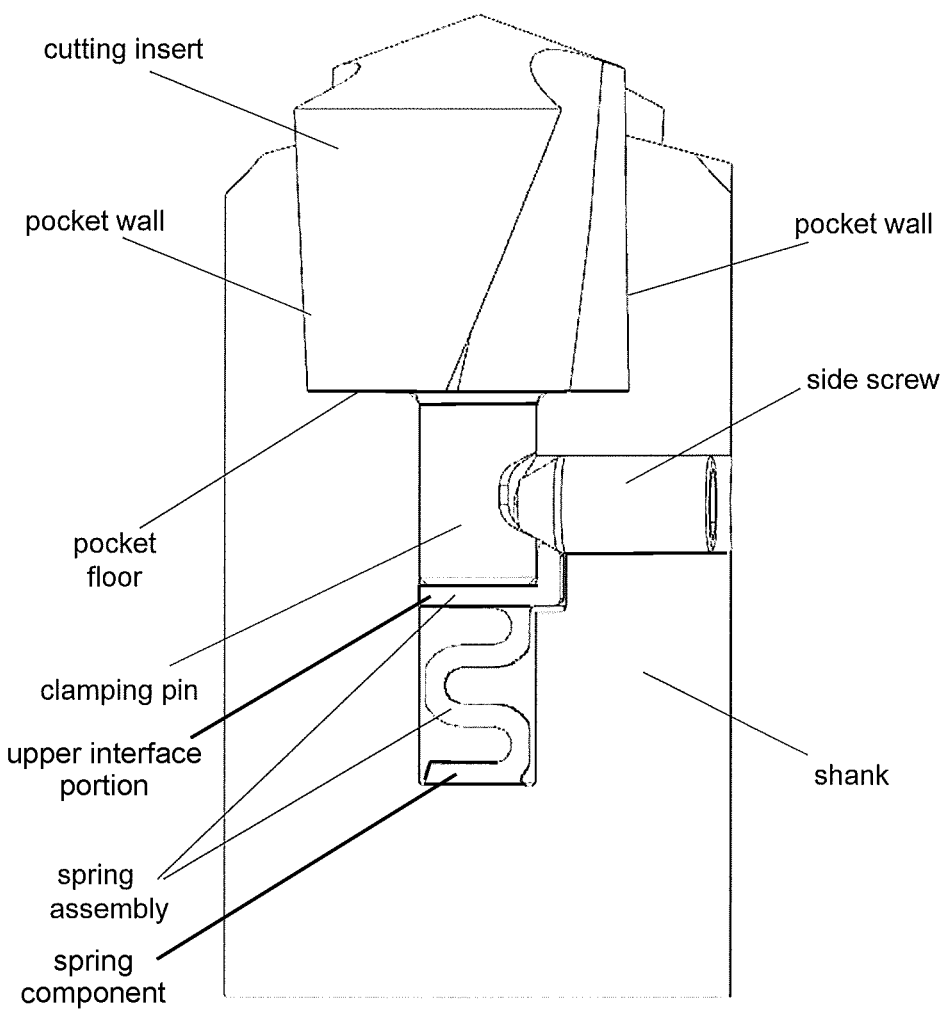
FIG. 11 provides a cut-away elevational view showing a third embodiment of a shank and cutting insert, with spring-assisted bump-off.

FIG. 11 provides a cut-away elevational view showing a third embodiment of a shank and cutting insert, with spring-assisted bump-off. This embodiment is substantially similar to that shown in FIG. 10, but the spring assembly includes a spring component which is formed as a separate component with respect to a "wedge" (or "reverse L") component constituting an upper interface portion (i.e., that component which contacts the lowermost portion of the cutting insert (and associated clamping pin) and also a surface of the side screw (when the side screw is in a position to be so contacted).

Figure 12:
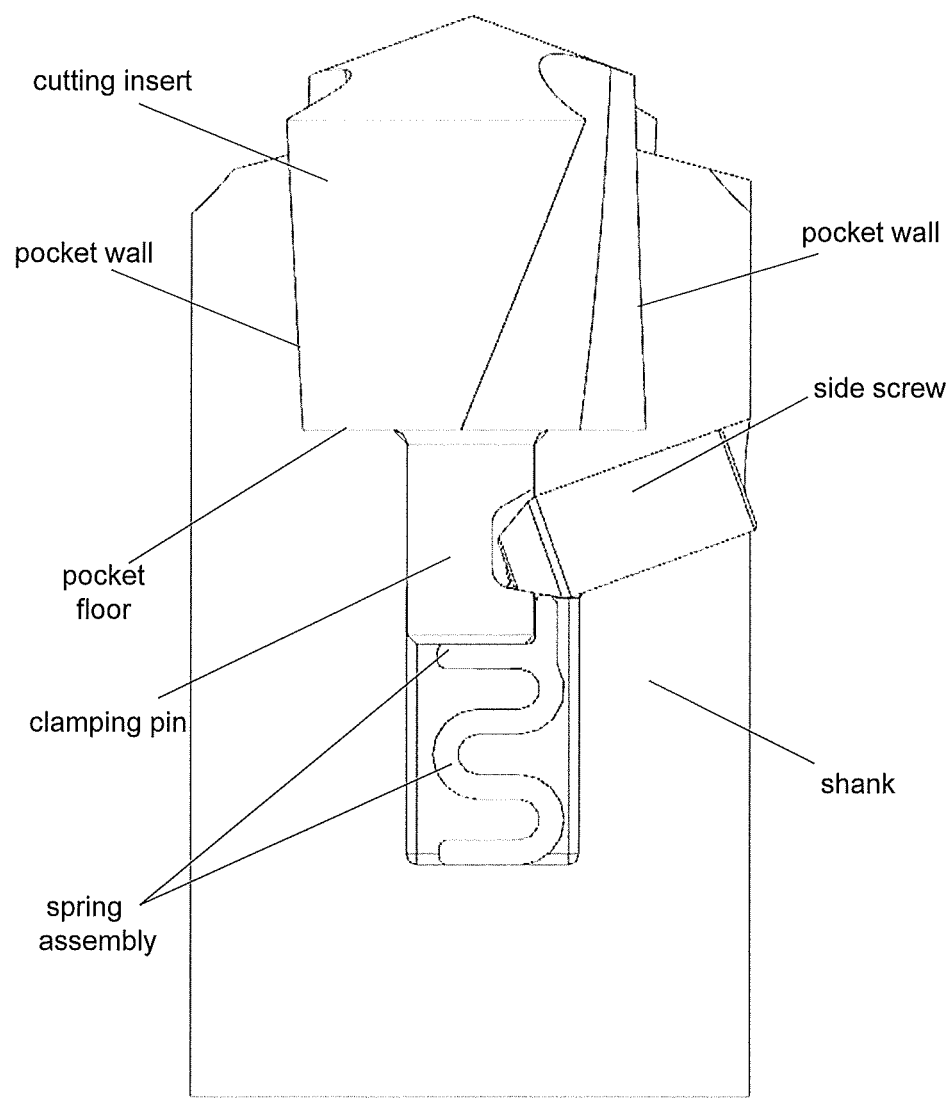
FIG. 12 provides a cut-away elevational view showing a fourth embodiment of a shank and cutting insert, with spring-assisted bump-off.

FIG. 12 provides a cut-away elevational view showing a fourth embodiment of a shank and cutting insert, with spring-assisted bump-off. This embodiment is substantially similar to that shown in FIG. 9, but with a smaller and differently configured upper interface portion (reverse "L"), and with spring component being disposed in a differently dimensioned and configured cavity.

Figure 13:
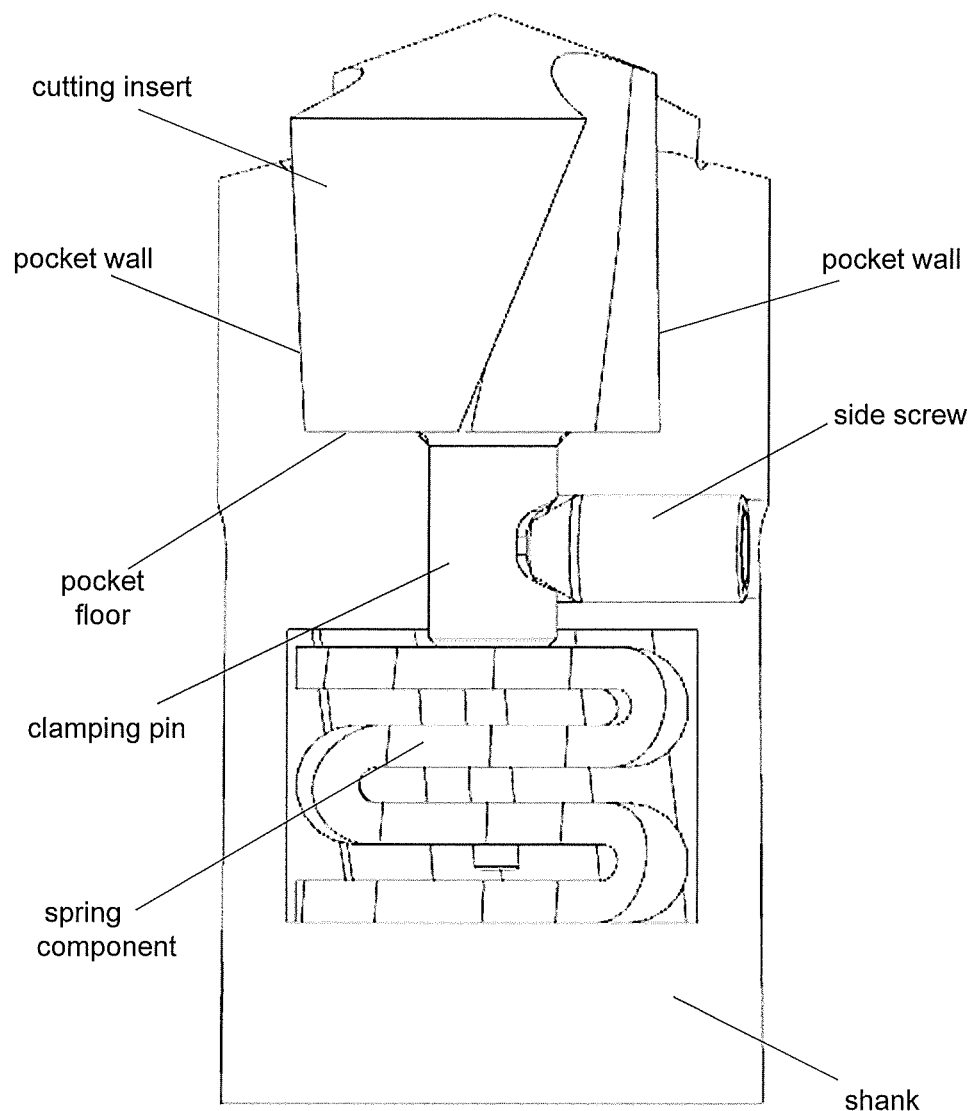
FIG. 13 provides a cut-away elevational view showing an embodiment of a shank and cutting insert with a spring assembly, with the cutting insert in a clamped position.

FIG. 13 provides a cut-away elevational view showing an embodiment of a shank and cutting insert with a spring assembly, with the cutting insert in a clamped position. The spring component shown includes features that will be better appreciated with respect to FIGS. 15A-D.

Figure 14:
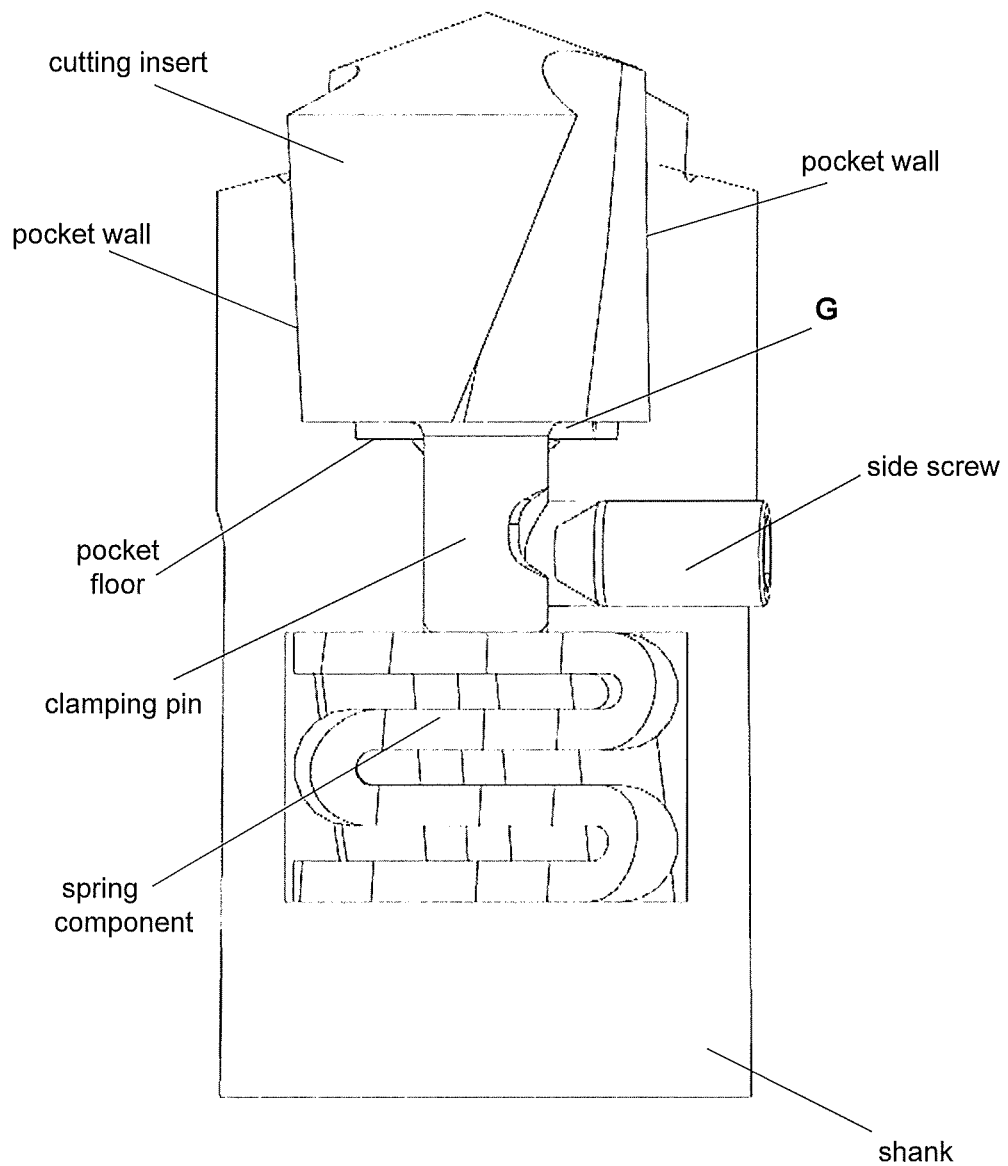
FIG. 14 provides essentially the same view as in FIG. 13, but showing the cutting insert in an unclamped position.
Figure 15A:
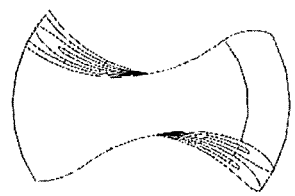
FIGS. 15A-D provide, respectively, a plan view, a front isometric view, a front elevational view and a side elevational view of an embodiment of a spring component.
Figure 15B:
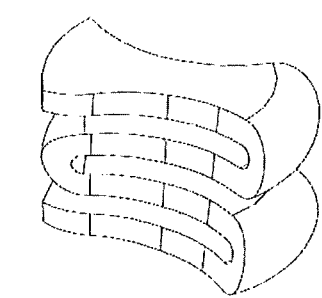
Figure 15C:
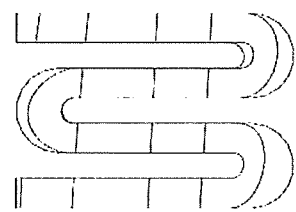
Figure 15D:
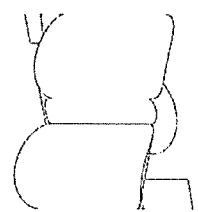

FIG. 14 provides essentially the same view as in FIG. 13, but showing the cutting insert in an unclamped position. Notable here is the gap G caused by interference between the shank (or body) and cutting insert, as variously discussed heretofore.

FIGS. 15A-D provide, respectively, a plan view, a front isometric view, a front elevational view and a side elevational view of an embodiment of a spring component. Such a spring component may be utilized with any and all embodiments described and contemplated herein, including for use as part or all of a "spring assembly" as described heretofore. As can be appreciated in particular from FIG. 15A but also FIGS. 15B-D, the spring component may have an outer contour or profile that defines a helical twist, essentially to be able to follow one or more flutes disposed in a shank. Thus, it can be appreciated that the outer contour/profile of the spring component can be shaped in such a manner to fit within, or follow internal contours of, a predefined space (e.g., a cavity whose internal features/dimensions are defined or even constrained by features of a shank such as flutes), yet at the same time sufficient coiling or kinking of the spring component (e.g., in a manner that can be appreciated from FIGS. 15B-D) can still be sufficient for providing an axial "bump-off" force of a magnitude (or in a manner) as discussed/contemplated heretofore.

Figures 16A, 16B:
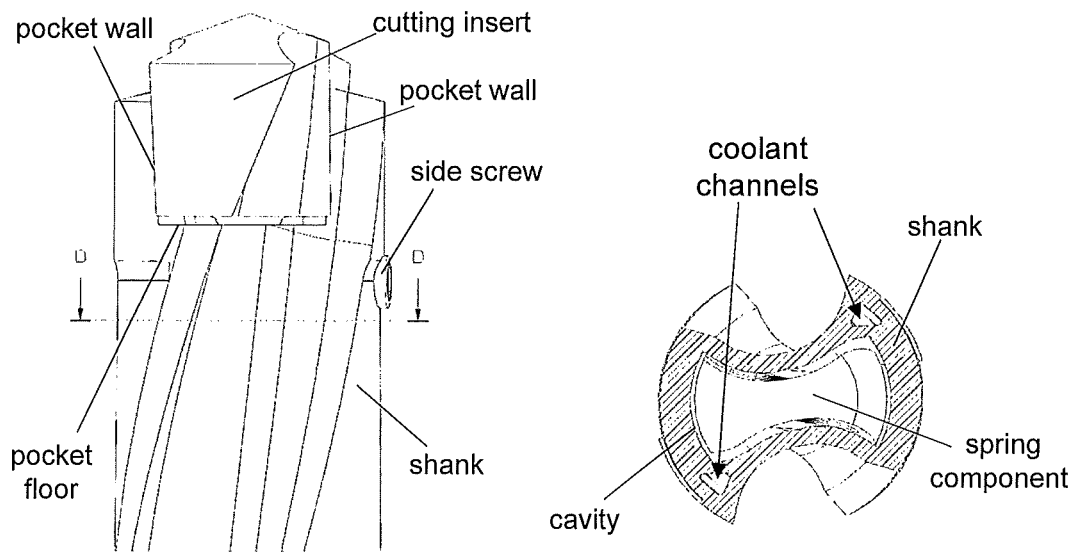
FIG. 16A provides a front elevational view of a shank and cutting insert according to an embodiment, and FIG. 16B provides a cross-section taken through the line D-D in FIG. 16A.

FIG. 16A provides a front elevational view of a shank and cutting insert according to an embodiment, and FIG. 16B provides a cross-section taken through the line D-D in FIG. 16A. As can be appreciated in particular from FIG. 16B, coolant channels may be disposed through the shank in a manner that still permits definition of a substantial internal cavity for accommodating a spring assembly or spring component. (Here, in accordance with the present example, the cavity and spring component alike may be thought of as essentially having a "bowtie"-type shape when viewed in cross-section with respect to a single horizontal plane.) As also shown, the coolant channels may have a defined cross-section to accommodate or match surrounding geometry. Here, the defined cross-section is generally triangular.

Figures 16C, 16D:
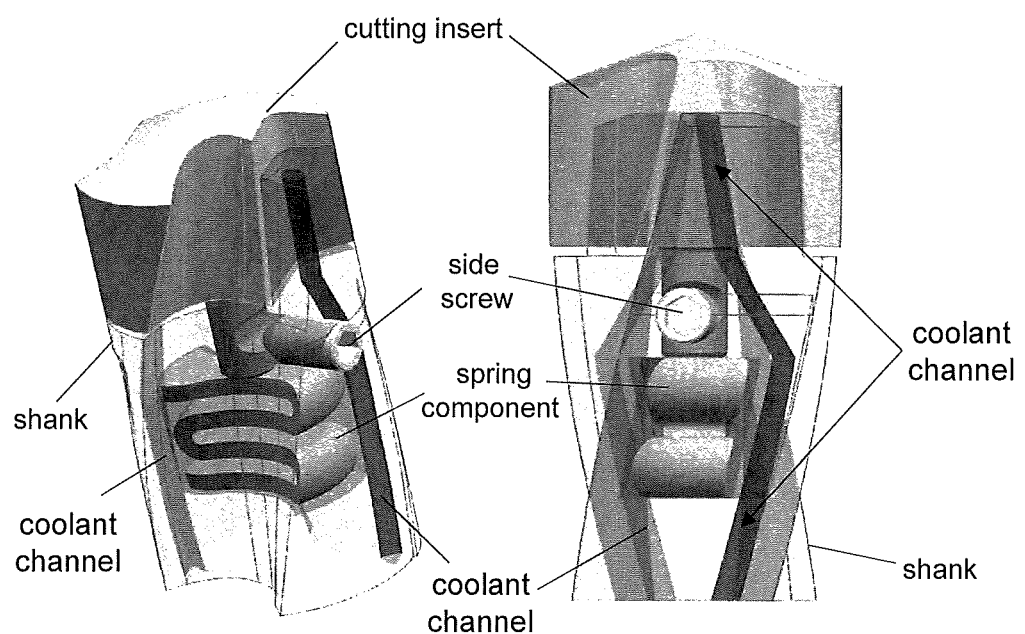
FIGS. 16C and 16D provide, respectively, a see-through front isometric view and a see-through side elevational view of a shank and cutting insert similar to that shown in FIGS. 16A/B.

FIGS. 16C and 16D provide, respectively, a see-through front isometric view and a see-through side elevational view of a shank and cutting insert similar to that shown in FIGS. 16A/B. Here, it can be appreciated that coolant channels may be configured and disposed so as to flank and circumvent the spring component (and associated cavity) in directing coolant axially forwardly in the shank (i.e., in a direction toward a cutting region in operation).

Figure 17:
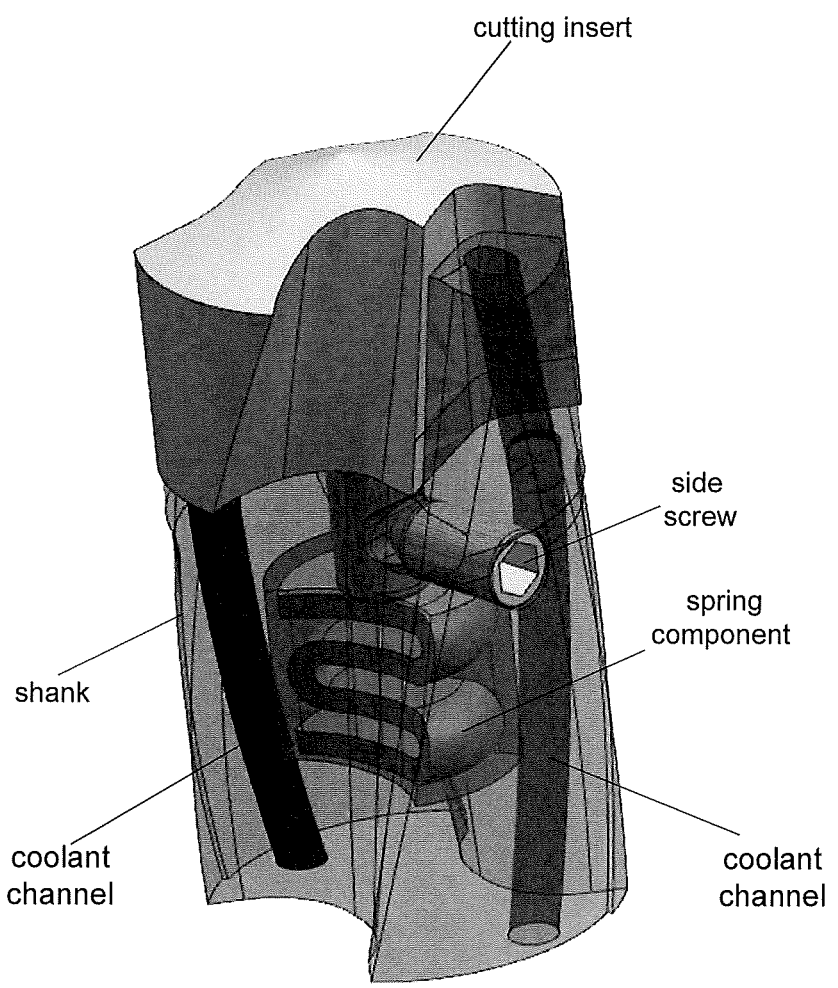
FIG. 17 provides a see-through front isometric view of a shank and cutting insert according to a variant embodiment.

FIG. 17 provides a see-through front isometric view of a shank and cutting insert according to a variant embodiment. Here, it can be appreciated that coolant channels may be configured and disposed similarly to the example of FIGS. 16C/D; however, here, the coolant channels may have a generally round (e.g., circular) cross-section.

Figure 18:
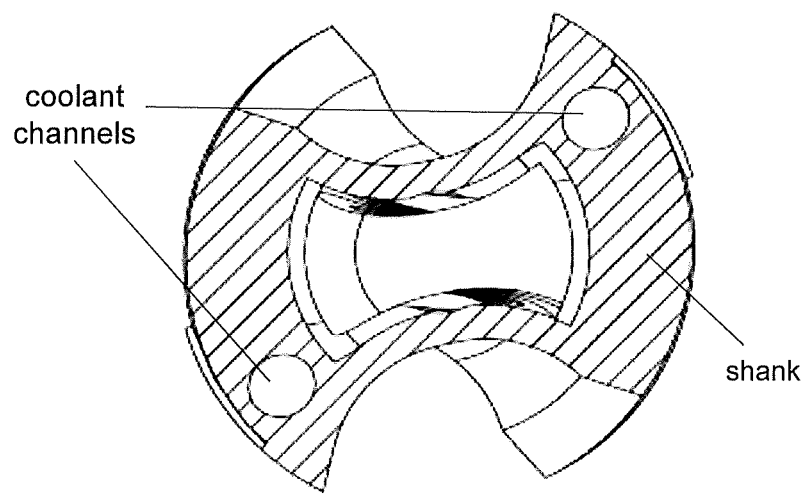
FIGS. 18 and 19 provide substantially the same view as FIG. 16B, but showing variant embodiments of coolant channels.
Figure 19:
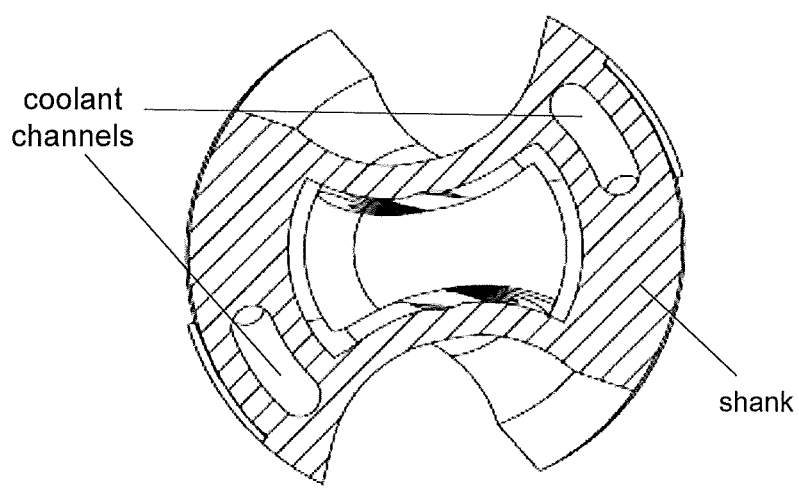

FIGS. 18 and 19 provide substantially the same view as FIG. 16B, but showing variant embodiments of coolant channels. Specifically, FIG. 18 shows coolant channels that are round (circular) in cross-section (thus consistent with the embodiment of FIG. 17), while FIG. 19 shows coolant channels that have an elongated slot shape, with rounded ends and extending arcuately (essentially in parallel to a circumference of the shank). Other variant cross-sectional shapes, other than those described and illustrated herein, are of course conceivable within the scope of embodiments described and contemplated herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments have been described herein with reference to the accompanying drawings, it is to be understood that the disclosure herein is not limited to those precise embodiments, and that various other changes and modifications may be affected therein by one skilled in the art without departing from the scope or spirit of the disclosure.

The invention claimed is:

1. A rotary cutting tool comprising:
   a shank; and
   an interchangeable cutting tip;
   the shank comprising a pocket which receives the interchangeable cutting tip via an interference fit;
   the pocket comprising two centering wall portions which, when viewed along a central longitudinal axis of the shank, are oriented at a non-zero angle with respect to one another;
   the interchangeable cutting tip being axially displaceable between:
   an initial position, which is assumed by the interchangeable cutting tip upon being received in the pocket of the shank;
   a clamped position, wherein the interchangeable cutting tip is fixedly held with respect to the shank; and
   a bump-off position, wherein the interchangeable cutting tip is not fixedly held with respect to the shank;
   a holding element which holds the interchangeable cutting tip in the clamped position; and
   a spring assembly comprising a spring component in direct contact with the interchangeable cutting tip,
   wherein the holding element directly engages a clamping pin of the interchangeable cutting tip when the interchangeable cutting tip is axially displaced from the initial position to the clamped position, thereby causing elastic deformation of the spring component to provide a biasing force on the interchangeable cutting tip when the interchangeable cutting tip is axially displaced between the clamped position and the bump-off position.

2. The rotary cutting tool according to claim 1, wherein the spring component has an outer contour which defines a helical twist.

3. The rotary cutting tool according to claim 2, wherein the entire spring component is formed via additive layer manufacturing.

4. The rotary cutting tool according to claim 2, wherein:
   the shank includes one or more flutes; and
   the outer contour of the spring component follows one or more of the flutes.

5. The rotary cutting tool according to claim 1, further comprising a cavity which accommodates at least a portion of the spring component.

6. The rotary cutting tool according to claim 5, wherein the cavity is disposed centrally in the shank, with respect to a plane which is transverse to the central longitudinal axis of the shank.

7. The rotary cutting tool according to claim 5, wherein the shank includes one or more coolant channels which are disposed to circumvent the cavity.

8. The rotary cutting tool according to claim 1, wherein at least a portion of the spring component is formed via additive layer manufacturing.

9. The rotary cutting tool according to claim 1, wherein the non-zero angle is between about 3 degrees and about 6 degrees.

10. The rotary cutting tool according to claim 1, wherein the holding element comprises a side screw.

11. A shank for a rotary cutting tool, the shank comprising:
    a pocket which receives an interchangeable cutting tip via an interference fit;
    the interchangeable cutting tip being axially displaceable between:
    an initial position, which is assumed by the interchangeable cutting tip upon being received in the pocket of the shank;
    a clamped position, wherein the interchangeable cutting tip is fixedly held with respect to the shank; and
    a bump-off position, wherein the interchangeable cutting tip is not fixedly held with respect to the shank;
    the pocket comprising two centering wall portions which, when viewed along a central longitudinal axis of the shank, are oriented at a non-zero angle with respect to one another;
    a holding element for holding an interchangeable cutting tip in a clamped position; and
    a spring assembly comprising a spring component in direct contact with the interchangeable cutting tip,
    wherein the holding element directly engages a clamping pin of the interchangeable cutting tip when the interchangeable cutting tip is axially displaced from the initial position to the clamped position, thereby causing elastic deformation of the spring component to provide a biasing force on the interchangeable cutting tip when the interchangeable cutting tip is axially displaced between the clamped position and the bump-off position.

12. A rotary cutting tool comprising:
    a shank; and
    an interchangeable cutting tip including a clamping pin;
    the shank comprising a pocket which receives the interchangeable cutting tip via an interference fit;
    the pocket comprising two centering wall portions which, when viewed along a central longitudinal axis of the shank, are oriented at a non-zero angle with respect to one another;

the interchangeable cutting tip being axially displaceable between:

an initial position, which is assumed by the interchangeable cutting tip upon being received in the pocket of the shank;

a clamped position, wherein the interchangeable cutting tip is fixedly held with respect to the shank; and a bump-off position, wherein the interchangeable cutting tip is not fixedly held with respect to the shank;

a holding element for holding the interchangeable cutting tip in the clamped position; and a spring assembly comprising a spring component and an upper interface portion, the spring assembly in direct contact with both the interchangeable cutting tip and the holding element, wherein the holding element directly engages both the spring assembly and the clamping pin of the interchangeable cutting tip when the interchangeable cutting tip is axially displaced from the initial position to the clamped position, thereby causing elastic deformation of the spring assembly and providing a biasing force on the interchangeable cutting tip when the interchangeable cutting tip is axially displaced between the clamped position and the bump-off position.

13. The rotary cutting tool according to claim 12, wherein the holding element first engages the spring assembly and then engages the clamping pin of the interchangeable cutting tip when the interchangeable cutting tip is axially displaced from the initial position to the clamped position.

14. The rotary cutting tool according to claim 12, wherein the upper interface portion is formed integrally with the spring component.

15. The rotary cutting tool according to claim 14, wherein at least a portion of the spring component is formed via additive layer manufacturing.

* * * * *